US012092363B2

(12) United States Patent
Scholten et al.

(10) Patent No.: US 12,092,363 B2
(45) Date of Patent: Sep. 17, 2024

(54) AIR PURIFIER IN A FURNITURE ARTICLE

(71) Applicant: BISSELL Inc., Grand Rapids, MI (US)

(72) Inventors: Jeffrey A. Scholten, Ada, MI (US); Derek Everett Smith, Grand Rapids, MI (US); Adam Brown, Holland, MI (US)

(73) Assignee: BISSELL Inc., Grand Rapids, MI (US)

(*) Notice: Subject to any disclaimer, the term of this patent is extended or adjusted under 35 U.S.C. 154(b) by 1077 days.

(21) Appl. No.: 16/299,561

(22) Filed: Mar. 12, 2019

(65) Prior Publication Data

US 2020/0289968 A1    Sep. 17, 2020

(51) Int. Cl.
*B01D 46/00* (2022.01)
*B01D 46/10* (2006.01)
*B01D 46/42* (2006.01)
*B01D 46/44* (2006.01)
*B01D 46/58* (2022.01)
*F24F 8/108* (2021.01)
*F24F 8/80* (2021.01)

(52) U.S. Cl.
CPC ............ *F24F 8/80* (2021.01); *B01D 46/0004* (2013.01); *B01D 46/0009* (2013.01); *B01D 46/0049* (2013.01); *B01D 46/10* (2013.01); *B01D 46/4245* (2013.01); *B01D 46/442* (2013.01); *B01D 46/58* (2022.01); *F24F 8/108* (2021.01)

(58) Field of Classification Search
CPC .............. B01D 46/0004; B01D 46/002; B01D 46/0049; B01D 46/10; B01D 46/4245; B01D 46/442

USPC .......................................................... 55/358
See application file for complete search history.

(56) References Cited

U.S. PATENT DOCUMENTS 3,462,920 A      8/1969  Denny
3,474,598 A *   10/1969  Keuls ........................ F24F 3/12
                                                                    96/294

(Continued)

FOREIGN PATENT DOCUMENTS

CN         205664504 U      10/2016
CN         106196319 A      12/2016

(Continued)

OTHER PUBLICATIONS

European Patent Office, Extended European Search Report re Corresponding Application No. 20159663.2-1008, Jul. 16, 2020, Munich, Germany.

(Continued)

*Primary Examiner* — Robert A Hopkins
*Assistant Examiner* — Qianping He
(74) *Attorney, Agent, or Firm* — McGarry Bair PC

(57) ABSTRACT

A room air purifier has a body with a frame at least partially defining an interior chamber and an opening to the chamber. A purification mechanism in the chamber includes one or more filters and one or more blowers. A panel is configured to removably mount to the body and cover the opening to the chamber. A base mounted to the body, and each leg of a set of legs is mounted to the base. A nonwoven fabric portion covers at least part of the body. The blower when activated generates an inflow through the nonwoven fabric portion and a filter, and an outflow though the body, all while hidden from view in what to an observer looks like an article of furniture.

18 Claims, 32 Drawing Sheets

(56) References Cited

U.S. PATENT DOCUMENTS

| | | | |
|---|---|---|---|
| 3,935,803 A | | 2/1976 | Bush |
| 4,100,324 A | * | 7/1978 | Anderson ............ C11D 17/049 |
| | | | 156/167 |
| 5,107,580 A | * | 4/1992 | Watanabe ............. B01D 46/02 |
| | | | 24/303 |
| 5,230,720 A | | 7/1993 | Kendall |
| 5,264,015 A | | 11/1993 | Matsui |
| 6,379,412 B1 | * | 4/2002 | Porterfield ......... B01D 46/0004 |
| | | | 55/493 |
| 6,503,458 B1 | | 1/2003 | Ogle |
| 9,681,747 B1 | * | 6/2017 | Pectol .................. H01R 25/006 |
| 9,730,518 B1 | * | 8/2017 | Jacobs .................. A47C 1/029 |
| 2003/0150326 A1 | * | 8/2003 | Chasen .................... F24F 8/10 |
| | | | 55/471 |
| 2005/0097870 A1 | * | 5/2005 | Moshenrose .......... B01D 53/32 |
| | | | 55/385.1 |
| 2007/0114830 A1 | * | 5/2007 | Newman ................ A47C 4/028 |
| | | | 297/440.1 |
| 2013/0106164 A1 | * | 5/2013 | Chacon ................ A47C 31/008 |
| | | | 297/463.1 |
| 2013/0190157 A1 | * | 7/2013 | Gogiberidze ............ A47G 5/00 |
| | | | 493/394 |
| 2014/0150658 A1 | * | 6/2014 | Prax ....................... B01D 46/10 |
| | | | 96/74 |
| 2015/0096216 A1 | * | 4/2015 | Hughes .................. F41A 23/16 |
| | | | 42/94 |
| 2017/0214197 A1 | * | 7/2017 | Suri ....................... A47B 97/00 |
| 2018/0154297 A1 | * | 6/2018 | Maletich .................. B60N 2/68 |
| 2018/0311998 A1 | * | 11/2018 | Zhu ........................ A47C 1/029 |

FOREIGN PATENT DOCUMENTS

| | | | |
|---|---|---|---|
| CN | 106765636 A | | 5/2017 |
| CN | 206150833 U | | 5/2017 |
| CN | 106969451 A | | 7/2017 |
| CN | 107048721 A | | 8/2017 |
| CN | 107191820 A | | 9/2017 |
| CN | 107238014 A | | 10/2017 |
| CN | 104879859 B | | 11/2017 |
| CN | 107388375 A | | 11/2017 |
| CN | 107422082 A | | 12/2017 |
| CN | 206910041 U | | 1/2018 |
| CN | 107960747 A | | 4/2018 |
| CN | 207266668 U | | 4/2018 |
| EP | 3444533 A1 | | 2/2019 |
| JP | H06343519 A | | 12/1994 |
| KR | 20040056152 A | * | 6/2004 |
| KR | 20170003339 U | | 9/2017 |
| WO | 2004092658 A1 | | 10/2004 |
| WO | 2017146637 A1 | | 8/2017 |

OTHER PUBLICATIONS https://www.behance.net/gallery/59075735/Side-table-type-air-purifier, Behance, Cozy Side table type air purifier, published Nov. 21, 2017, 11 pgs.

European Patent Office, Extended European Search Report re Corresponding Application No. 22151097.7-1016, May 13, 2022, 8 pages, Munich, Germany.

* cited by examiner

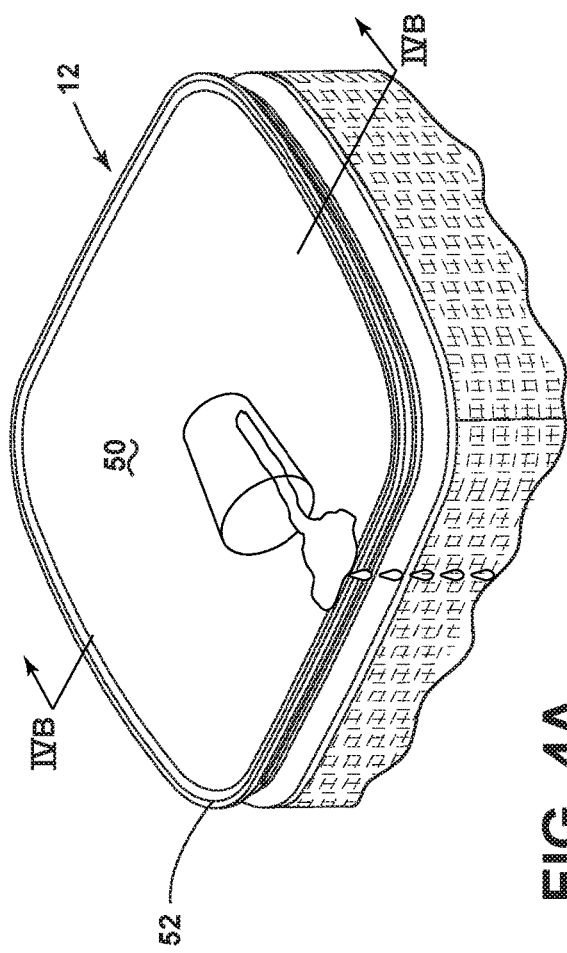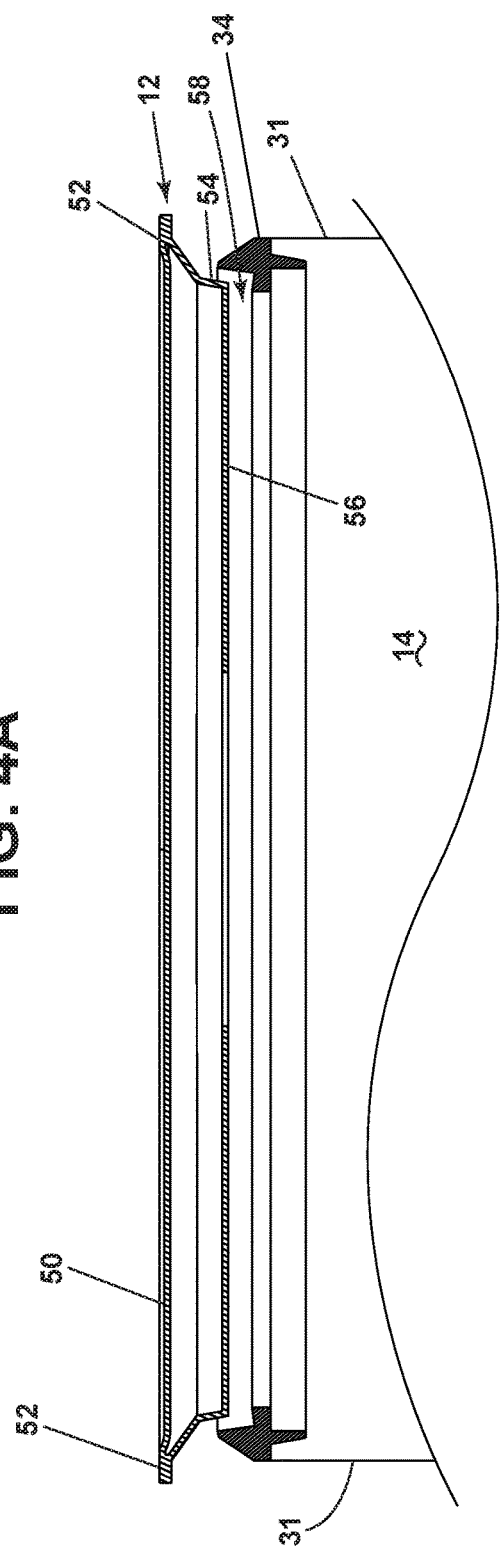
FIG. 4A
FIG. 4B

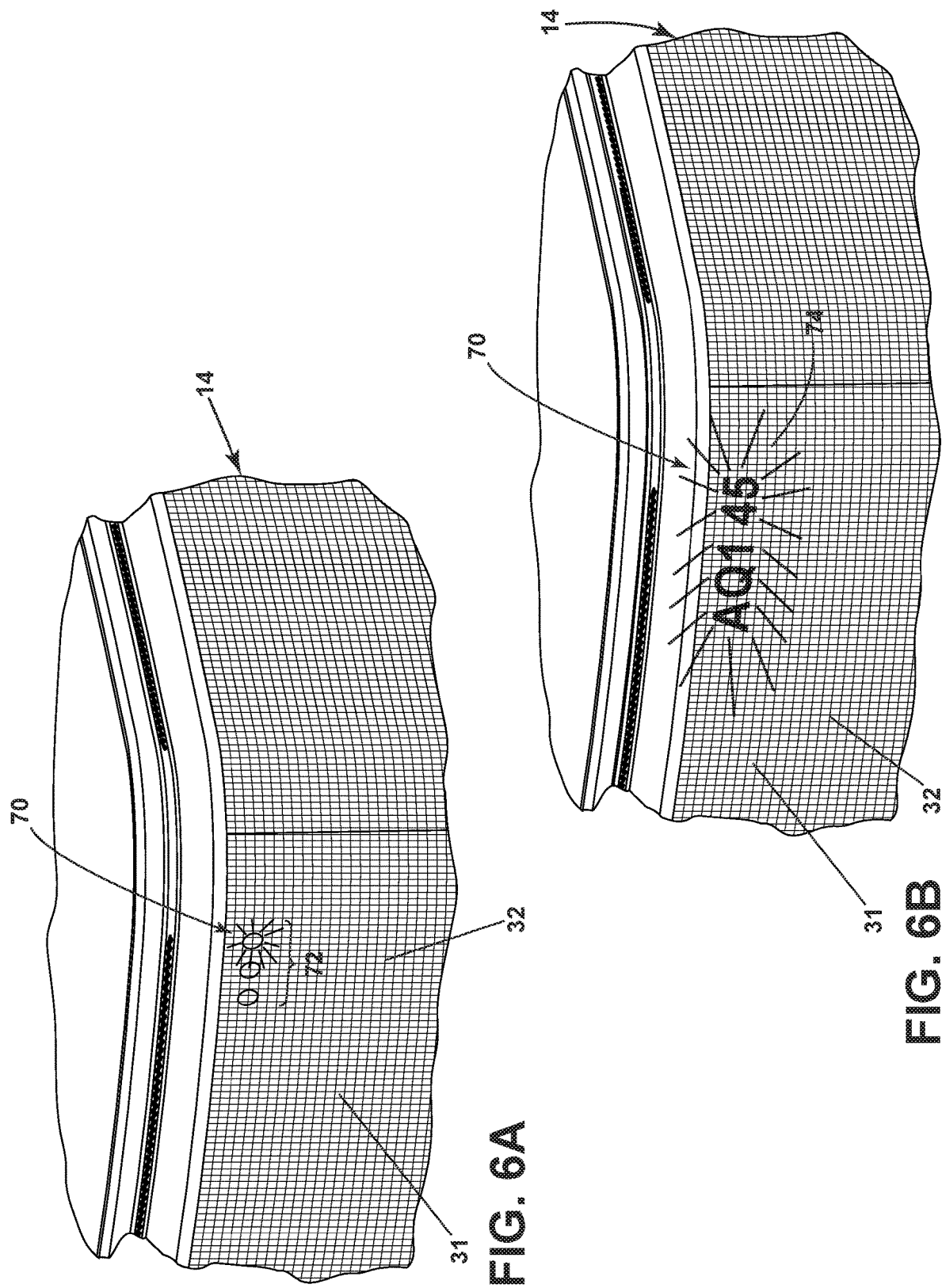

AIR PURIFIER IN A FURNITURE ARTICLE

BACKGROUND

Air purifying devices incorporated into decorative articles or into articles of furniture are known. Such devices typically use filters or ultraviolet light or ion injectors to purify the air surrounding the device. Yet there are continual issues in manufacture, operation, function, and ornamental appearance that remain unresolved.

BRIEF SUMMARY

One aspect of the invention is directed to a room air purifier having a body with a frame at least partially defining an interior chamber and an opening to the chamber. A purification mechanism in the chamber is in fluid communication through the frame with an exterior of the body, and the purification mechanism includes one or more filters and one or more blowers. A panel is configured to removably mount to the body and cover the opening to the chamber. A base is mounted to the body, and each leg of a set of legs is mounted to the base. A nonwoven fabric portion covers at least part of the body. The blower when activated generates an inflow through the nonwoven fabric portion and the filter, and an outflow though the body, all while hidden from view in what to an observer looks like an article of furniture.

BRIEF DESCRIPTION OF THE DRAWINGS

In the drawings:

FIGS. 4a and 4b are a sectional side views of a portion of the first embodiment of FIG. 1 taken along line 4-4 of FIG. 1.

FIGS. 6a and 6b are front views of a portion of the first embodiment of FIG. 1 showing a user interface.

DETAILED DESCRIPTION

The present disclosure relates to various aspects of an air purifier that are unobtrusive in a distinctly ornamental appearance of an article of furniture, yet also include distinctly improved functional features hidden in the ornamental appearance. Such features relate to intelligent control, automatically switchable configurations, easily convertible arrangements, and amplified filtration by at least a nonwoven portion of a fabric covering, among other things.

Figure 1:
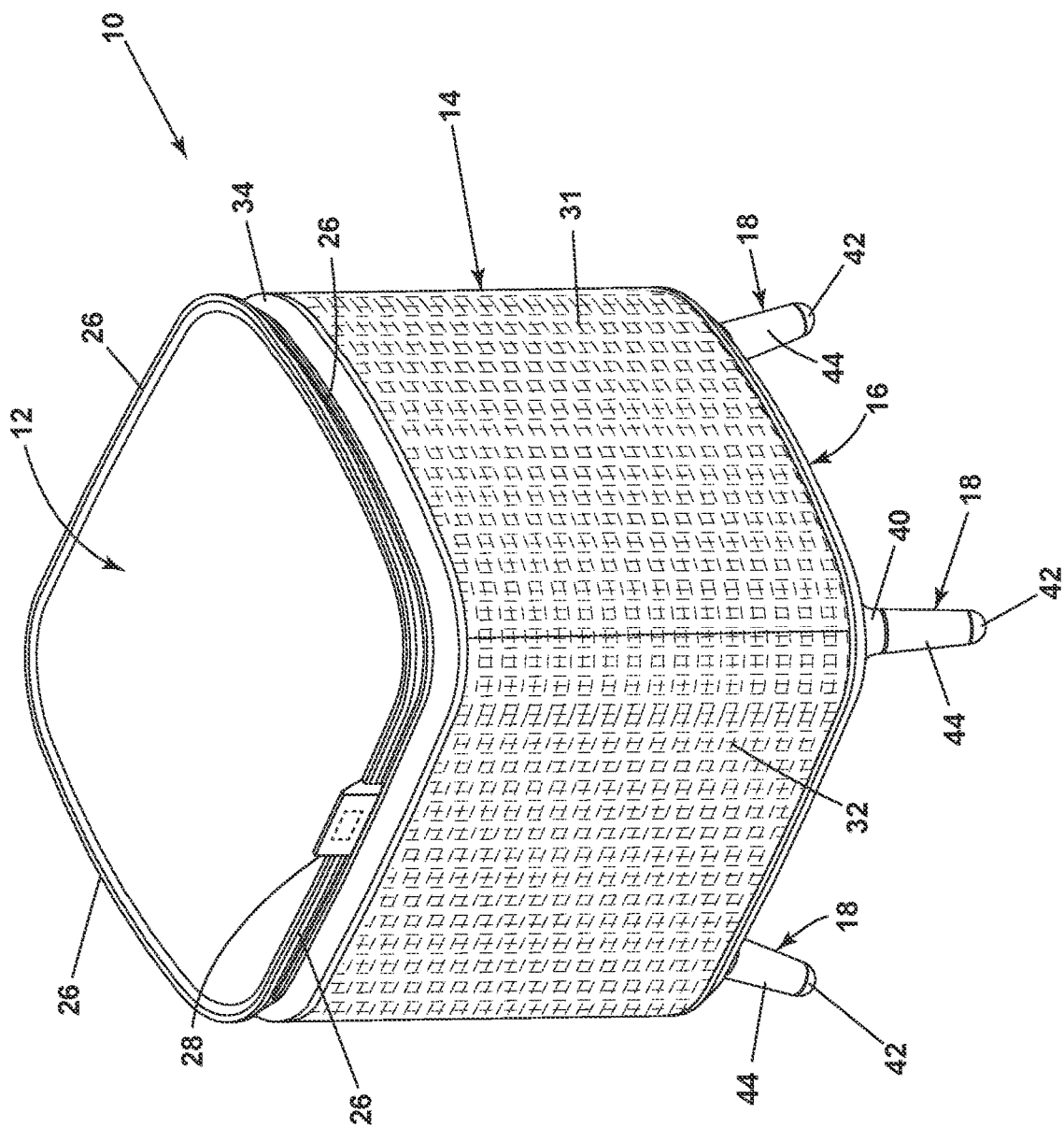
FIG. 1 is an isometric view of a first embodiment of an article of furniture having an air purifier function according to various aspects described herein.
Figure 2:
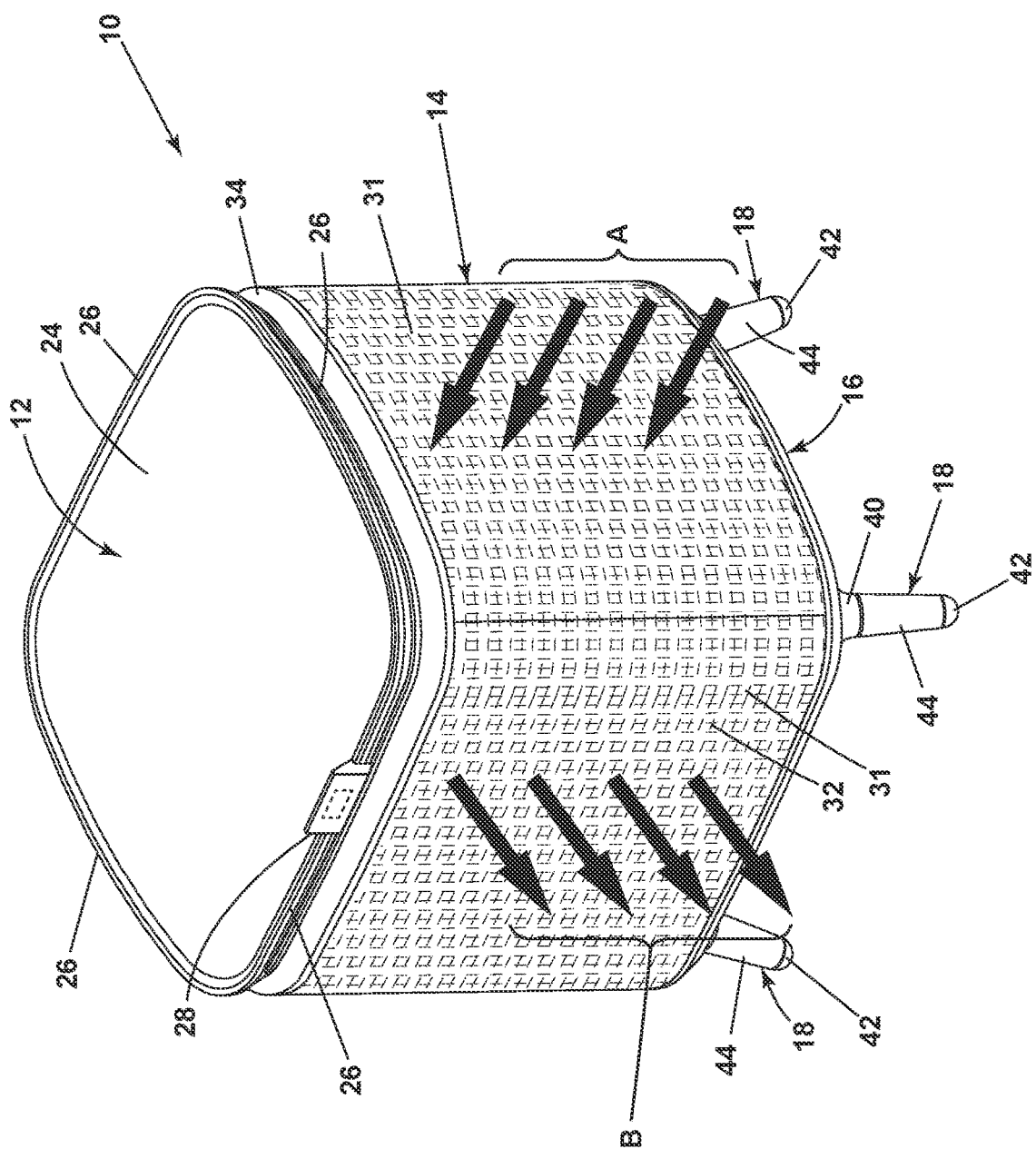
FIG. 2 is a schematic illustration of a direction of air flow in the first embodiment of FIG. 1.
Figure 3:
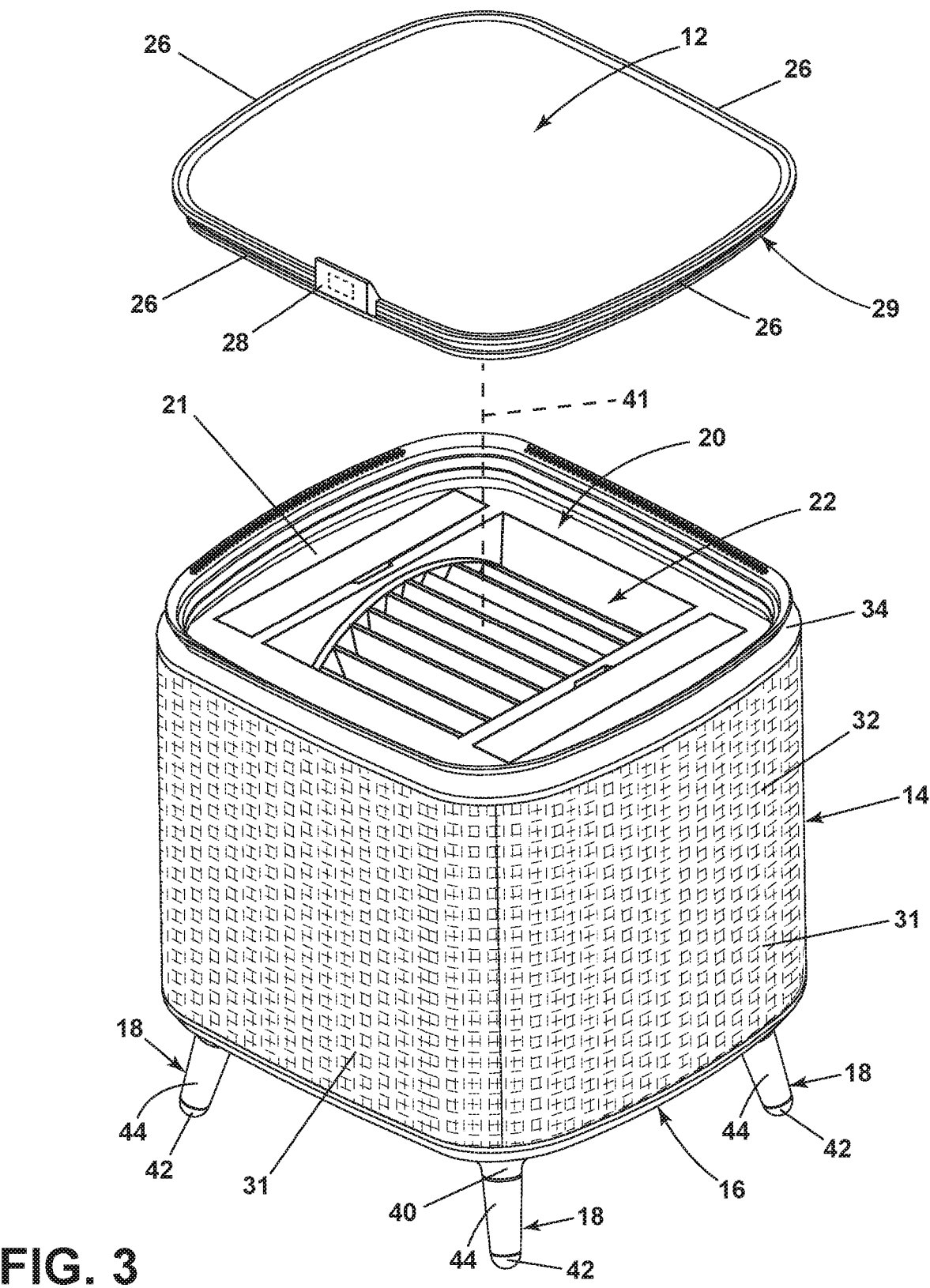
FIG. 3 is an exploded view of aspects of the first embodiment of FIG. 1.

FIGS. 1-3 illustrate basic elements of an embodiment of an air purifier 10 configured as an article of furniture. The air purifier 10 comprises a top 12, a body 14, a base 16, and a set of legs 18 extending from the base 16 that enables the air purifier 10 to be supported on a floor or other surface. The body 14 encloses a chamber 20 that includes a purification mechanism 22. The chamber 20 has an opening 21 at an upper end of the body 14, which can be covered by the top 12. As shown in FIG. 2, air flow is directed into and out of the body 14 by the purification mechanism 22, dirty air being drawn into the body 14 according to the inflow A, and clean air being exhausted from the body 14 according to the outflow B. The top 12 is preferably a structure formed of a polymer, either molded, injected, or assembled, though other materials such as wood or metal are within the scope of the invention. The top 12 comprises an upper surface 24 that is configured to look like and function as a tabletop, and sides 26 that are preferably dimensioned to be equal where the overall horizontal cross section of the top 12 and the body 14 will be square. Thus, the top 12 can be oriented on the body 14 in any one of four possible positions. The top 12 may include a user interface 28 on one of the sides 26 where the square configuration will enable a user to position the user interface 28 on any side of the body 14 by simply rotating the top 12 relative to the body 14 before positioning the top 12 on the body 14. Alternatively, one or more elements of the user interface 28 can be coupled to, located on, or incorporated into the upper surface 24 of the top 12. It is contemplated that the user interface 28 can include a water resistant or waterproof touch display. The water resistant or waterproof touch display can include, but are not limited to, technologies such as described by International Protection Marking codes as IPX4 and IPX5. It is further contemplated that the top 12 can include a lower surface 29 of suitable outward use so that the top 12 can be rotated vertically and seated in a position where either the lower surface 29 or the upper surface 24 is exposed. The vertical rotation allows the top 12 to optionally be oriented on the body 14 in any one of eight possible positions. The lower surface 29 and the upper surface 24 can be manufactured or coated in different materials. By way of non-limiting example, materials that can be used to coat at least one or more portions of the lower surface 29 or the upper surface 24 include glass, wood veneer, plastic, cloth, or metal.

The top 12 may be configured to attach to the body 14 in any one of several well-known ways, including, but not limited to nesting in a socket on the body 14, resting on a shoulder on the body 14, snap-fitting to the body 14, latching to the body 14, or being hinged to the body 14. Further, the top 12 may have an electrical connection (not shown) coupled to the user interface 28 on a side 26 that will engage another electrical connection (not shown) on the body 14 that is coupled to the purification mechanism 22, or that is on the purification mechanism 22 for direct coupling when the top 12 is attached to the body 14. It will be understood that a user interface 28 on the top 12 is optional, and that the horizontal cross sectional shape of the top 12 and the body 14 need not be square. For example, if two opposing sides of 26 of the top 12 are longer than the other two opposing sides 26 of the top, the horizontal cross sectional shape will be generally rectangular. Within the scope of the invention, the horizontal cross sectional shape can be any shape consistent with being an ornamental article of furniture. For, example, the horizontal cross sectional shape may be triangular where two sides are intersected by a hypotenuse, such as a corner cabinet where the two sides are disposed against the walls at a corner, and the hypotenuse is exposed to view. In another example, the hypotenuse need not necessarily be straight; it may be circular, curved, or arcuate to accentuate other features in the article.

The body 14 will preferably have a horizontal cross sectional shape similar to the top 12. Though it will be understood that the body 14 may have any horizontal cross sectional shape, regardless of the horizontal cross sectional shape of the top, so long as the top 12 effectively covers the opening 21 of the chamber 20. The body 14 includes a frame 30 with openings configured to allow the inflow A and the outflow B through vertical sides 31 to fluidly communicate with the purification mechanism 22. The frame 30 is preferably covered completely with a fabric 32 that is adapted to act as pre-filter for the inflow A. The frame 30 can include structures such as ribs, contoured protrusions, or other supporting structures such that the fabric can be configured into predetermined patterns or shapes when the air purifier 10 is activated. Alternatively, one or more openings (not shown) not covered in fabric can be provided between the top 12 and the body 14 that are configured to allow the inflow A and the outflow B through vertical sides 31 to fluidly communicate with the purification mechanism 22.

The fabric 32 will preferably be knitted to have a greater porosity than a woven fabric, and preferably wherein the porosity is such that no more than 250 pascals of pressure drop will occur across the fabric with an air inflow A of 300 cubic feet per minute (CFM) or 0.142 cubic meters per second ($m^3$/s). Furthermore, the inflow A need not necessarily by on a side different from the outflow B. The inflow A may be in one portion of a given side, and the outflow B may be in another portion of the given side; the inflow A may be on a side opposite from the outflow B; and there may be multiple inflows A as well as multiple outflows B.

A bezel 34 is provided between the top 12 and the body 14. The bezel 34 may be configured as an adapter to enable different tops 12 to attach to different bodies 14. As well, the bezel 34 may be a decorative feature to enhance the ornamental appearance of the air purifier 10. In this respect, the bezel 34 may be formed of a different material than either the top 12 or the body 14, and it may have a different texture or color than either the top 12 or the body 14. Further, it will be understood that a user interface (not shown) can be provided on the bezel 34.

The base 16 is preferably formed of a material similar to the top 12, i.e., a polymer, either molded, injected, or assembled, though other materials such as wood or metal are within the scope of the invention. The base 16 can include receptacles or sockets 40 to receive the set of legs 18. Preferably, each socket 40 will project at an angle generally outwardly away from a central axis 41. The number of sockets 40 will generally equal the number of legs 18 in the set. The base is preferably adapted to be permanently affixed to the body 14 and to have a footprint that is no larger than that of the body 14. Alternatively, the set of legs 18 can directly attach to the base 16 without sockets 40.

Each leg 18 is attached to the socket in any one of various well known ways, such as bolting, screwing, bayonet fixture, or snap or press fit. The legs 18 may be formed of wood, polymer, or composite materials, and will preferably have a tapered shape. Each leg 18 will have an elastomeric cap 42 at its terminal end to absorb vibrations and minimize noise from the air purifier 10. The legs 18 may also be covered by a hydrographic sleeve 44, with or without texture. The number of legs 18 will typically be four, though more or fewer are within the scope of the invention, so long as the number of legs is adequate to support the air purifier 10 on a surface.

FIGS. 4a and 4b show more detail about an embodiment of the top 12. The top 12 comprises a recessed area 50 surrounded by a lip 52 raised above the surface of the recessed area 50. It will be understood that the lip 52 inhibits the flow of liquid that may be spilled on the top 12 beyond the lip 52. Moreover, the lip 52 preferably extends beyond the vertical sides 31 of the body 14 so that any liquid that might flow over the lip 52 will fall beyond the sides 26 and not dribble down the vertical sides 31. In FIG. 4b, it can be seen that the top 12 has a depending sidewall 54 and base wall 56 that nests in a shoulder 58 on the body 14, or as shown in FIG. 4b, the bezel 34.

Figure 5B:
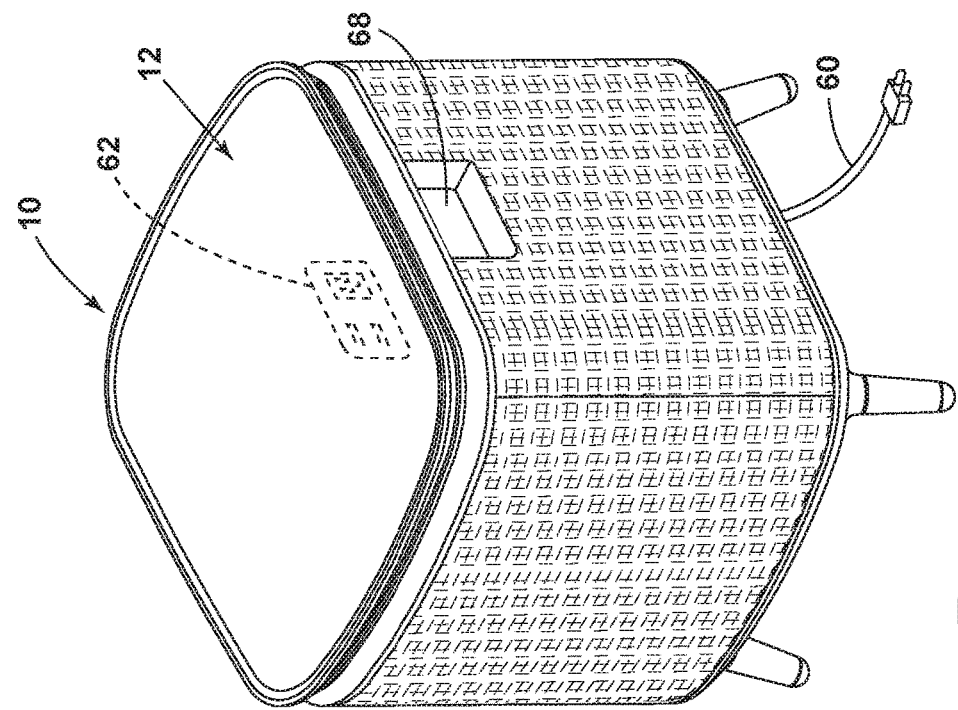
FIGS. 5a and 5b are rear views of a portion of the first embodiment of FIG. 1 showing electrical access.
Figure 5A:
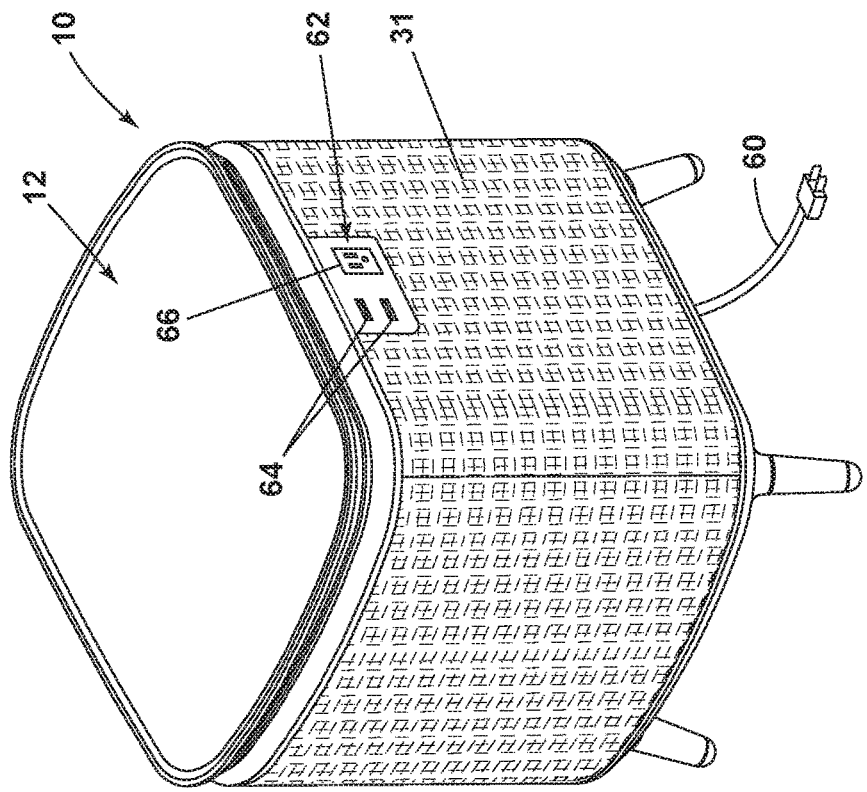

FIGS. 5a and 5b show embodiments providing wire management in the air purifier 10. In FIG. 5a, it can be seen that power is provided to the air purifier 10 by a cord 60 preferably extending through the base 16 to the components therein that require power, such as a user interface, motors, controllers, and the like. In FIG. 5a, a power panel 62 is disposed on the vertical side 31 near the top 12 to enable convenient access for devices that may be supported on the top 12. For example, the power panel 62 may have Universal Serial Bus (USB) ports 64, or any other power pass-through connector, and a pass through power socket 66. Electronic devices that require power for charging by a USB cord, for example, can be plugged into the USB ports, and appliances that require power from a conventional socket can be plugged into the power socket 66. In FIG. 5*b*, it is contemplated that the power panel 62 can be disposed in the chamber 20, and accessible via the opening 21 when the top 12 is moved to expose the opening 21. In this embodiment, USB and power cords can extend through a power port 68 to connect to the power panel 62 inside the body 14. While a USB port has been specifically described as an example, it is contemplated that any power pass-through connector, including inductive charging can be used additionally or alternatively to the USB port.

FIGS. 6*a* and 6*b* show embodiments of a user interface 70 disposed on the vertical side 31 of the body 14, preferably hidden from view by the fabric 32 when not in display. In FIG. 6*a*, the user interface 70 may comprise a plurality of lights 72, which are visible from behind the fabric 32 when the plurality of lights 72 are activated. In FIG. 6*b*, the user interface 70 comprises a plurality of indicia 74, which are visible from behind the fabric 32 when activated, and that are readable by a user.

Figure 7:
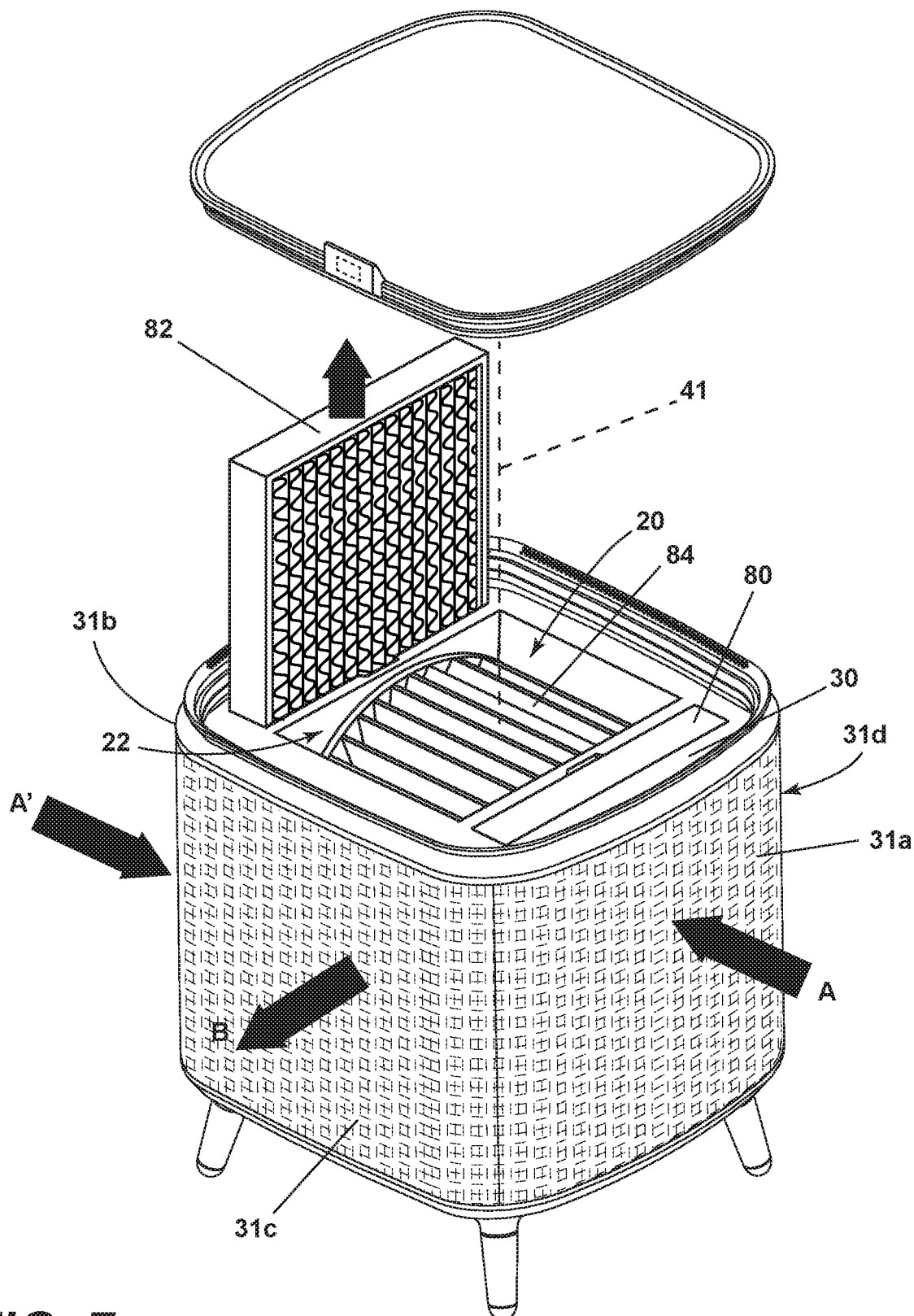
FIG. 7 is an isometric view a portion of the first embodiment of FIG. 1 with the top removed.

FIG. 7 shows an embodiment of the purification mechanism 22. A first filter 80 is disposed in the frame 30 on one vertical side 31*a* of the body 14 where inflow A enters the chamber. A second filter 82 is disposed in the frame 30 on another vertical side 3 lb of the body 14 where another inflow A' enters the chamber. The first and second filters 80, 82 may be alike, or they may differ in various aspects such as thickness, filter media, porosity, and intended pollutant capture. For example, the first filter 80 can be configured to capture particulates and the second filter 82 may be configured to capture gases. The frame 30 may have adjustable vents (not shown) behind the fabric 32 that are controllable to permit or obstruct the inflows A, A' as desired. In this respect, it may be that a user wishes to filter only particulates and not gases in which case the purification mechanism 22 can be set to permit the inflow A and obstruct the inflow A'. Or a user may wish to filter only gases, and not particulates, in which case the purification mechanism 22 can be set to permit the inflow A' and obstruct the inflow A. The purification mechanism 22 includes a single blower 84 that generates the outflow B. The frame 30 may be configured to direct the outflow B from one or both vertical sides 31*c*, 31*d*. Preferably, the first and second filters 80, 82 are independently removable for easy cleaning or replacement.

Figure 8:
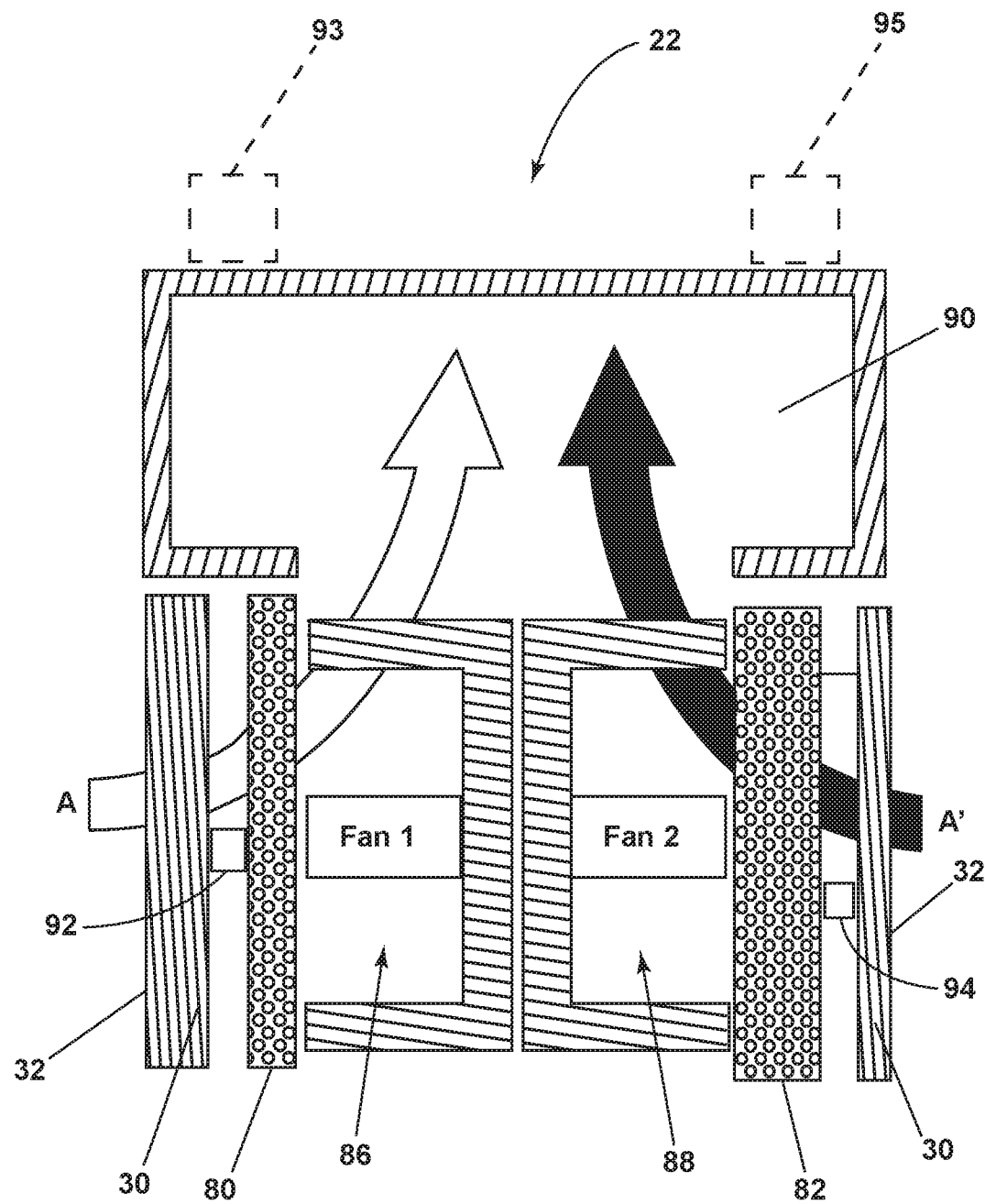
FIG. 8 is a schematic view of an alternative air purifier configuration according to various aspects described herein.

FIG. 8 schematically shows an embodiment where the purification mechanism 22 comprises independent blowers 86, 88, each one associated with the corresponding first or second filter 80, 82 respectively. Thus, inflow A may pass through the fabric 32, the frame 30 and the first filter 80 before entering a plenum 90. Separately, inflow A' may pass through the fabric 32, the frame 30 and the second filter 82 before entering the plenum 90. The first and second filters 80, 82 can be uniquely designed for filtration of particulate matter (PM) or volatile organic compounds (VOC). Each independent blower 86, 88 may be independently controllable. It will be appreciated that when only one blower is operating, the chamber 20 will be configured to prevent one inflow from exhausting anywhere other than the specified outflow B.

At least one PM sensor 92 or a gas or VOC sensor 94 can be in communication with the independent blowers 86, 88 to adjust the speed of one or more independent blower 86, 88 based on input from the at least one PM sensor 92 or the VOC sensor 94. By way of non-limiting example, the at least one PM sensor 92 or the VOC sensor 94 are illustrated between the fabric 32 and the first and second filters 80, 82. It is contemplated that the location of the at least one PM sensor 92 or the VOC sensor 94 can be at any location on or in the air purifier 10. By way of further non-limiting example, the plenum 90 in turn may include a PM sensor 93 or a VOC sensor 95 in addition to or as an alternative to the at least one PM sensor 92 or VOC sensor 94.

It is further contemplated that any number or type of sensors can be in communication with the independent blowers 86, 88. Sensor types can include, but are not limited to, odor sensors, motion sensors, temperature sensors, humidity sensors, optical sensors, or aural sensors.

Figure 9:
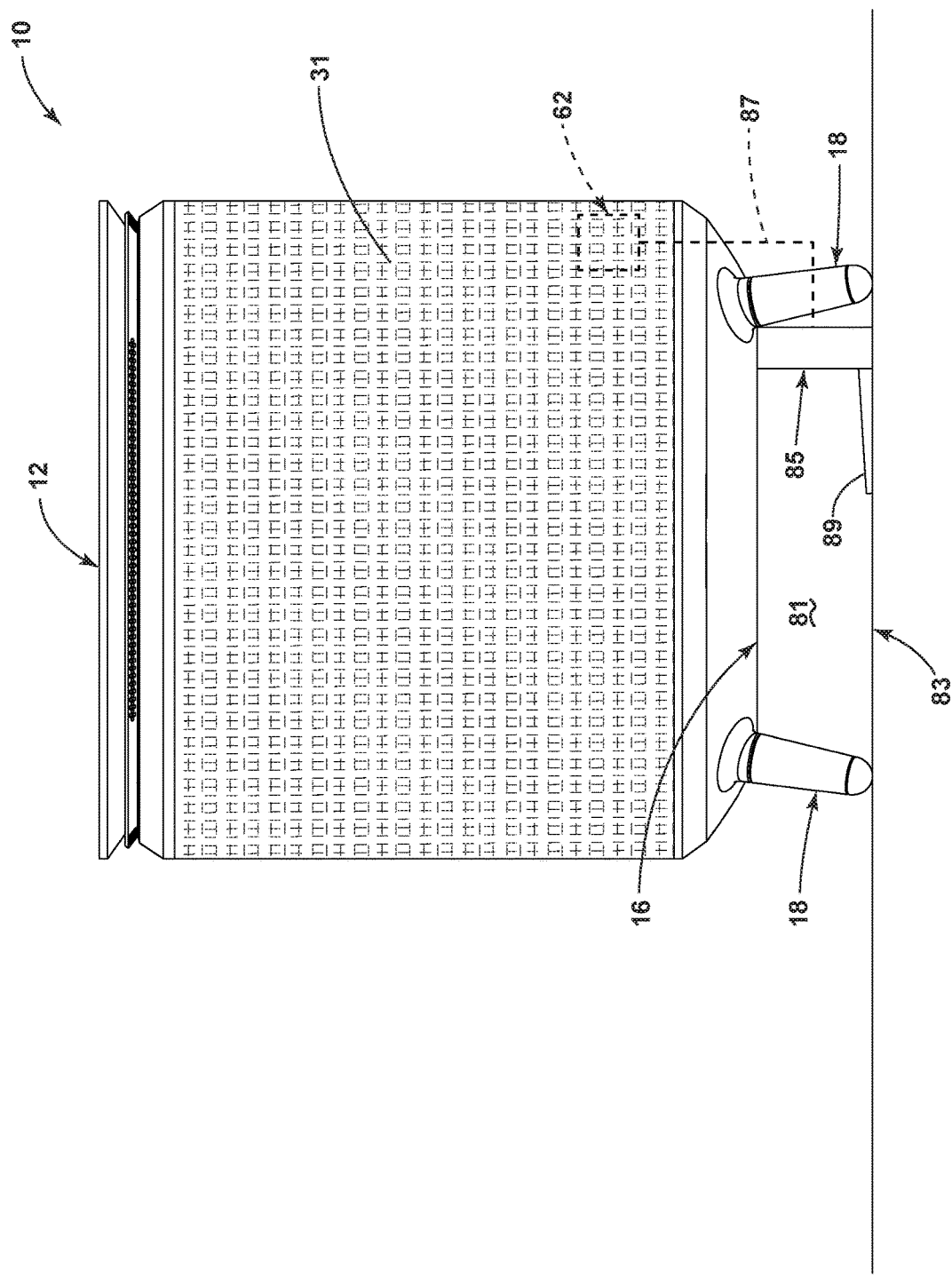
FIG. 9 is a side view of the first embodiment of FIG. 1 showing an access area.

FIG. 9 is a side view of the air purifier 10 illustrating an access area 81 defined by the set of legs 18, the base 16, and a floor 83. A docking station 85 can be located in or adjacent to the access area 81. The docking station 85 can be electrically connected to the air purifier 10 via a connector 87 using any known electrical connection. It is contemplated that the connector 87 can illustrate a wireless induction of electricity between the air purifier 10 and the docking station 85.

The connector 87 is illustrated as connecting the power panel 62 of the air purifier 10 to the docking station 85, however, it is contemplated that connector 87 can couple to any portion of the air purifier 10 that permits the flow of electricity to the docking station 85. Optionally, the docking station 85 can include a protrusion 89 that extends into the access area 81.

Figure 10:
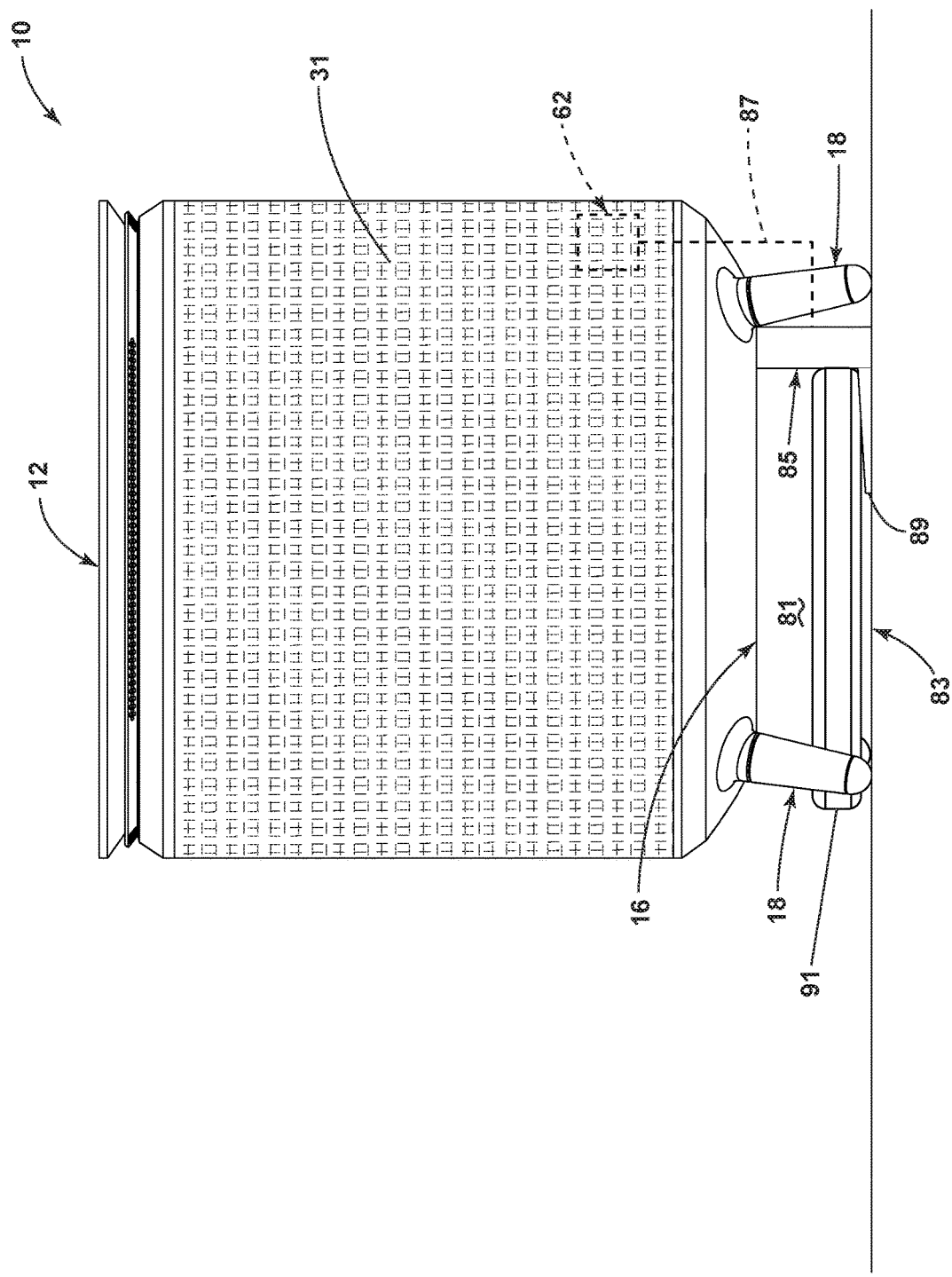
FIG. 10 is the side view FIG. 9 incorporating an autonomous floor cleaning device.

FIG. 10 illustrates an autonomous floor cleaning device 91 coupled to the docking station 85. It is contemplated that the autonomous floor cleaning device 91 can be any autonomous vehicle.

Figure 11:
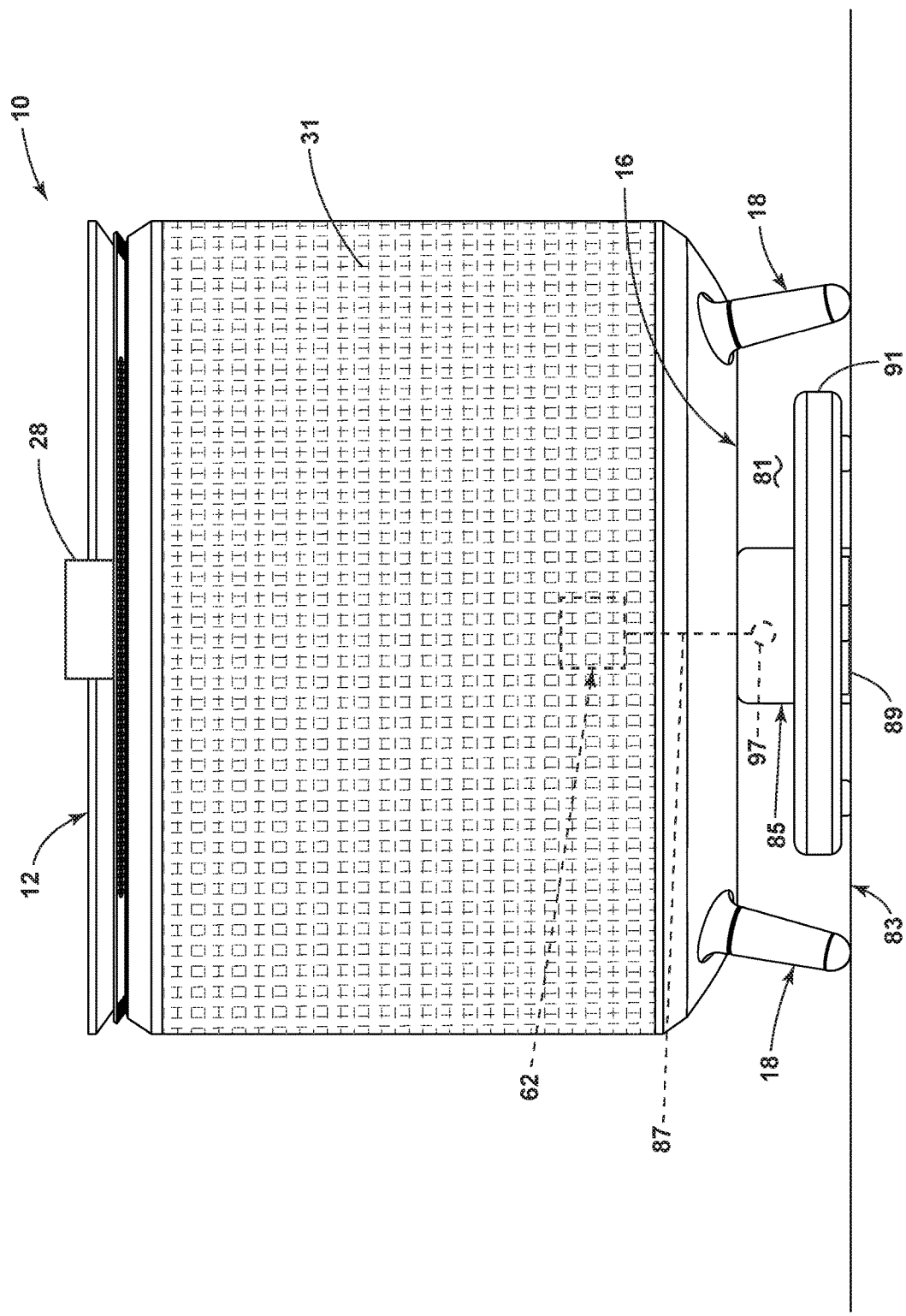
FIG. 11 is a front view of the first embodiment of FIG. 1 incorporating an autonomous floor cleaning device.

FIG. 11 further illustrates the access area 81 with, by way of non-limiting example, the autonomous floor cleaning device 91. The set of legs 18 partially defining the access area 81 which can be thought of as an opening under the air purifier 10 which receives the docking station 85. A communications module 97 coupled to the docking station 85 can be used to autonomously guide the autonomous floor cleaning device 91 to the docking station 85. The communications module 97 can use, by way of non-limiting example, infrared line-of-sight homing beacons to communicate with the autonomous floor cleaning device 91.

Figure 12:
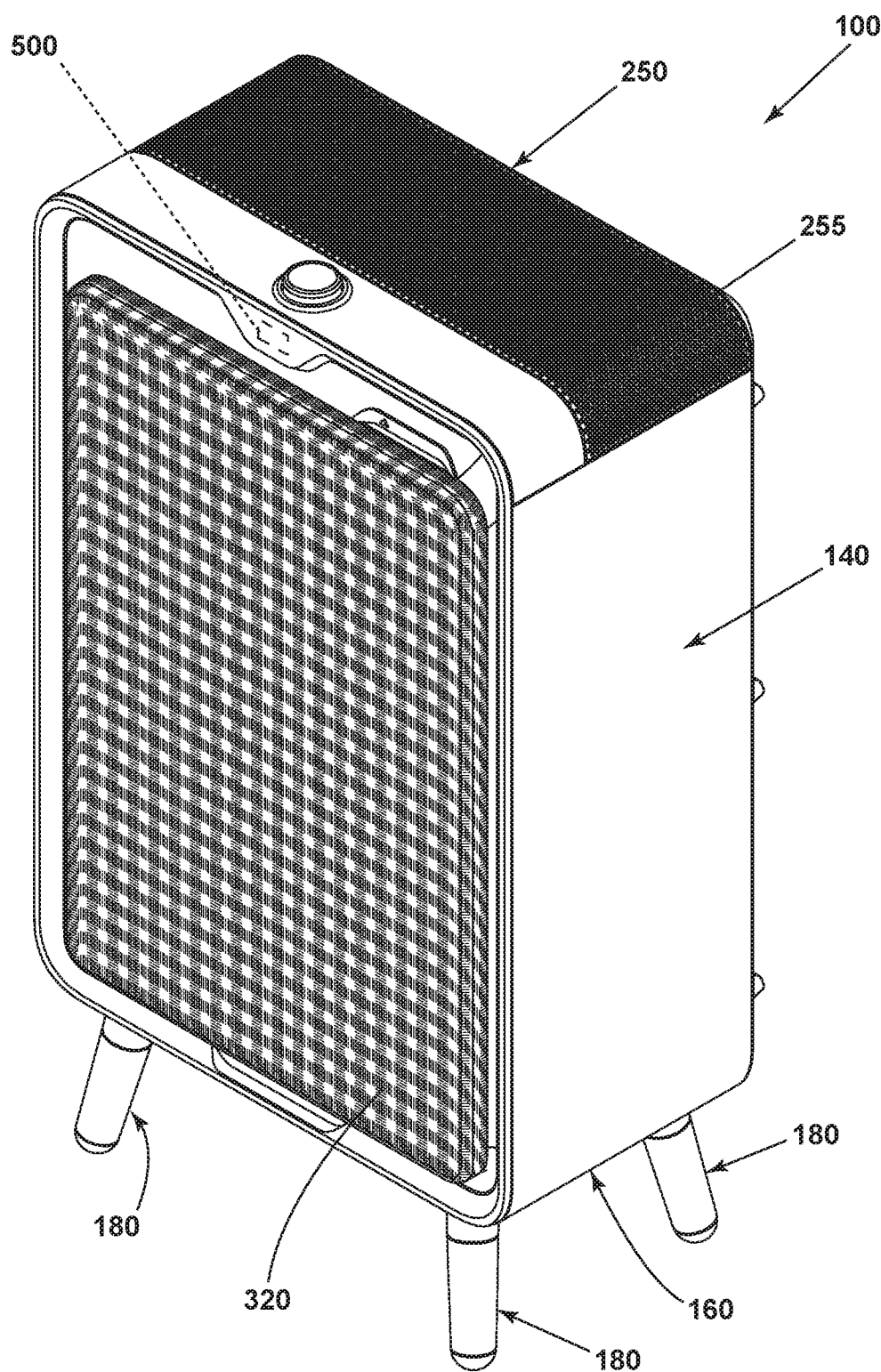
FIG. 12 is an isometric view of another embodiment of an article of furniture having an air purifier function according to various aspects described herein.
Figure 13:
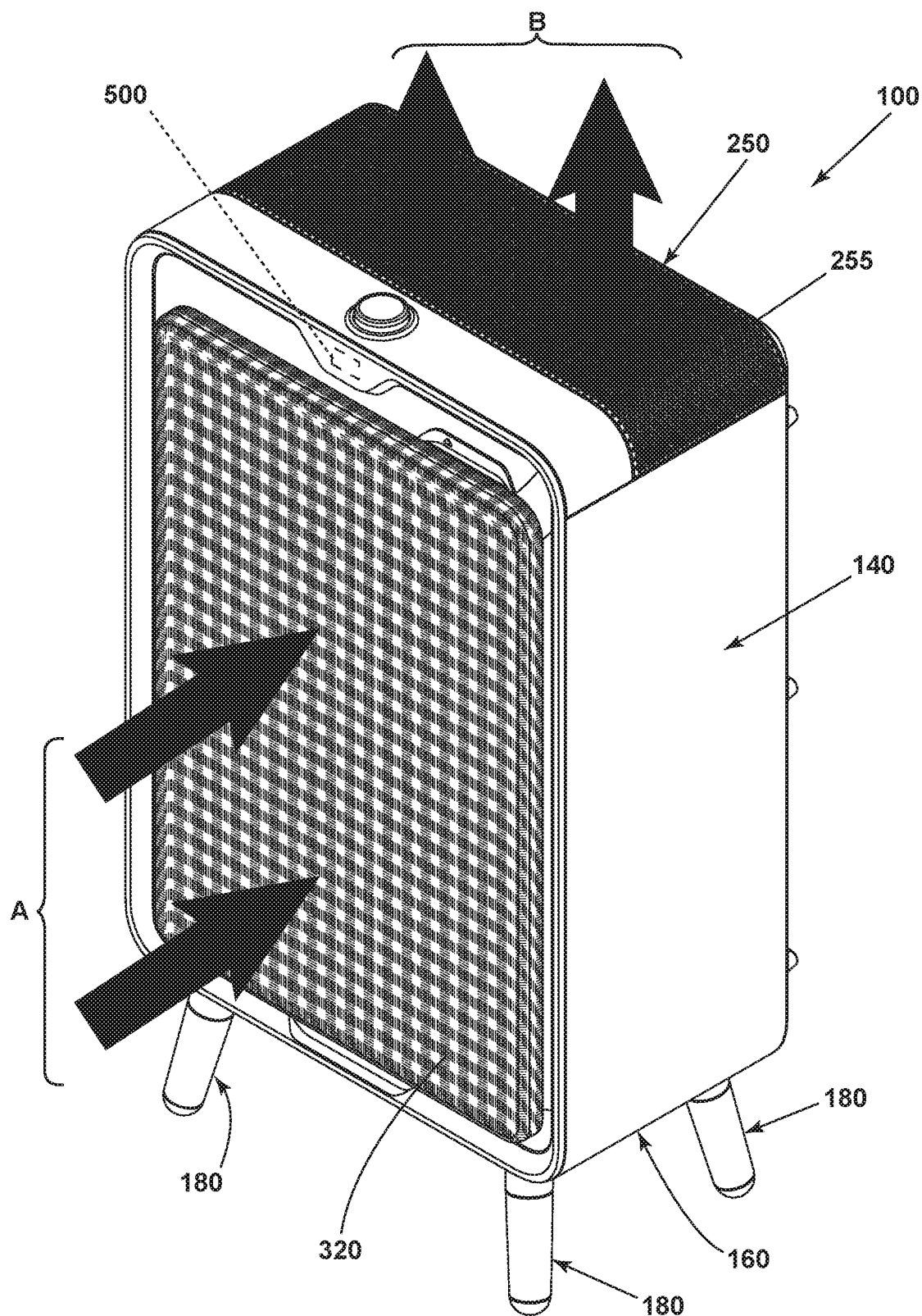
FIG. 13 is a schematic illustration of a direction of air flow in the embodiment of FIG. 12.
Figure 14:
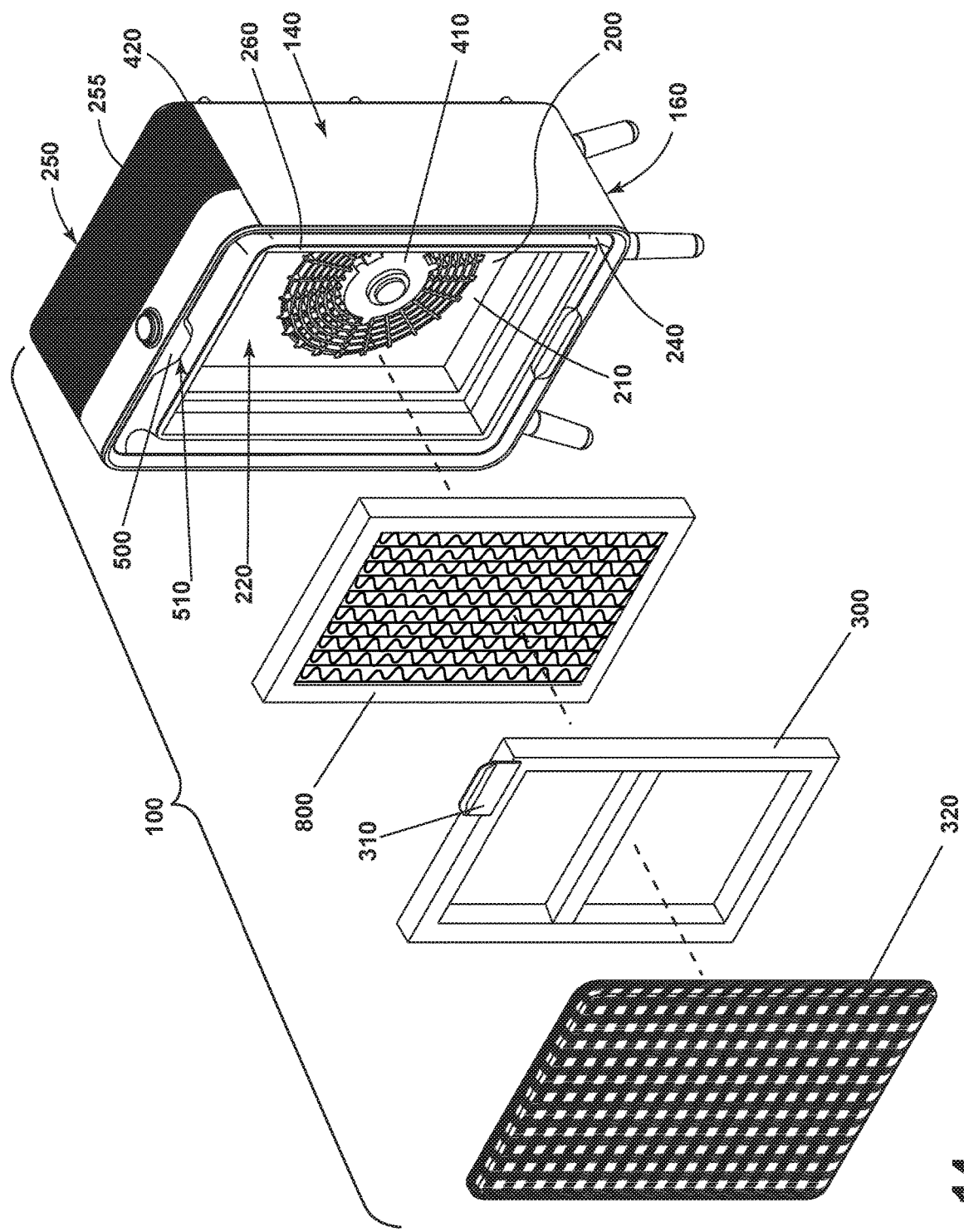
FIG. 14 is an exploded view of aspects of the embodiment of FIG. 12.

FIGS. 12-14 illustrate basic elements of another embodiment of an air purifier 100. The air purifier 100 comprises a body 140, a base 160, and a set of legs 180 extending from the base 160 that enables the air purifier 100 to be supported on a floor or other surface. The body 140 encloses a chamber 200 that includes a purification mechanism 220. The chamber 200 has a front opening 210 in a recess 240 in the body 140. The front opening 210 is adapted to receive an inflow A to the chamber 200. A top 250 has a plurality of openings 255 that enable an outflow B from the chamber 200.

The front opening 210 is bounded by a jamb 260 in the recess 240 that is configured to receive an open frame 300 by friction fit. Additionally or alternatively, hooks or detented latches can be used to secure the open frame 300. A tab 310 on the frame 300 enables the frame to be removed from and replaced on the jamb 260. A fabric cover 320 is attached to the frame 300 in any one of several well know ways such that it preferably can be movable with the frame 300 as a unit. The fabric cover 320 and the frame 300 are configured such that portion of the fabric cover 320 extends over the recess 240 to create the impression of an infinity background. The fabric cover 320 is adapted to act as pre-filter for the inflow A. The fabric cover 320 will preferably be knitted to have a greater porosity than a woven fabric, and preferably wherein the porosity is such that no more than 250 pascals of pressure drop will occur across the fabric with an air inflow A of 300 CFM. Moreover, the position of the jamb 260 in the recess 240 preferably defines what appears to the casual observer as an infinity background for the fabric cover 320 when the frame 300 is mounted to the jamb 260.

A filter 800 is configured to be mounted within the frame 300 to provide a designed filer function to the inflow A. Because the filter 800 is changeable, different types of filters may be used, such as particulate filters or gaseous filters of varying capacities.

The purification mechanism 220 includes a single blower 410 that generates airflow in a channel 420 in fluid communication with the plurality of openings 255 in the top 250. The blower 410 draws the inflow A through the pre-filter of the fabric cover 320, the open frame 300 and the filter 800, and exhausts the filtered outflow B trough the channel 420 and the plurality of openings 255. It will be appreciated that the blower 410 may be controlled by a variable speed controller (not shown) to adjust the speed of the inflow A, and the outflow B. As well, a single blower may be replaced by more than one blower, and more than one filter to accommodate different filtering functions, such as particulate and gaseous filtering.

A user interface 500 may be disposed on a tab 510 depending from the body 140 over the recess 240 so that it appears to float over the infinity background. The user interface 500 may be any type of display from individual coded lights to a fully integrated text and graphic display. It will be appreciated that visibility and aesthetics may be enhanced by lighting provided to the recess 240.

Figure 15:
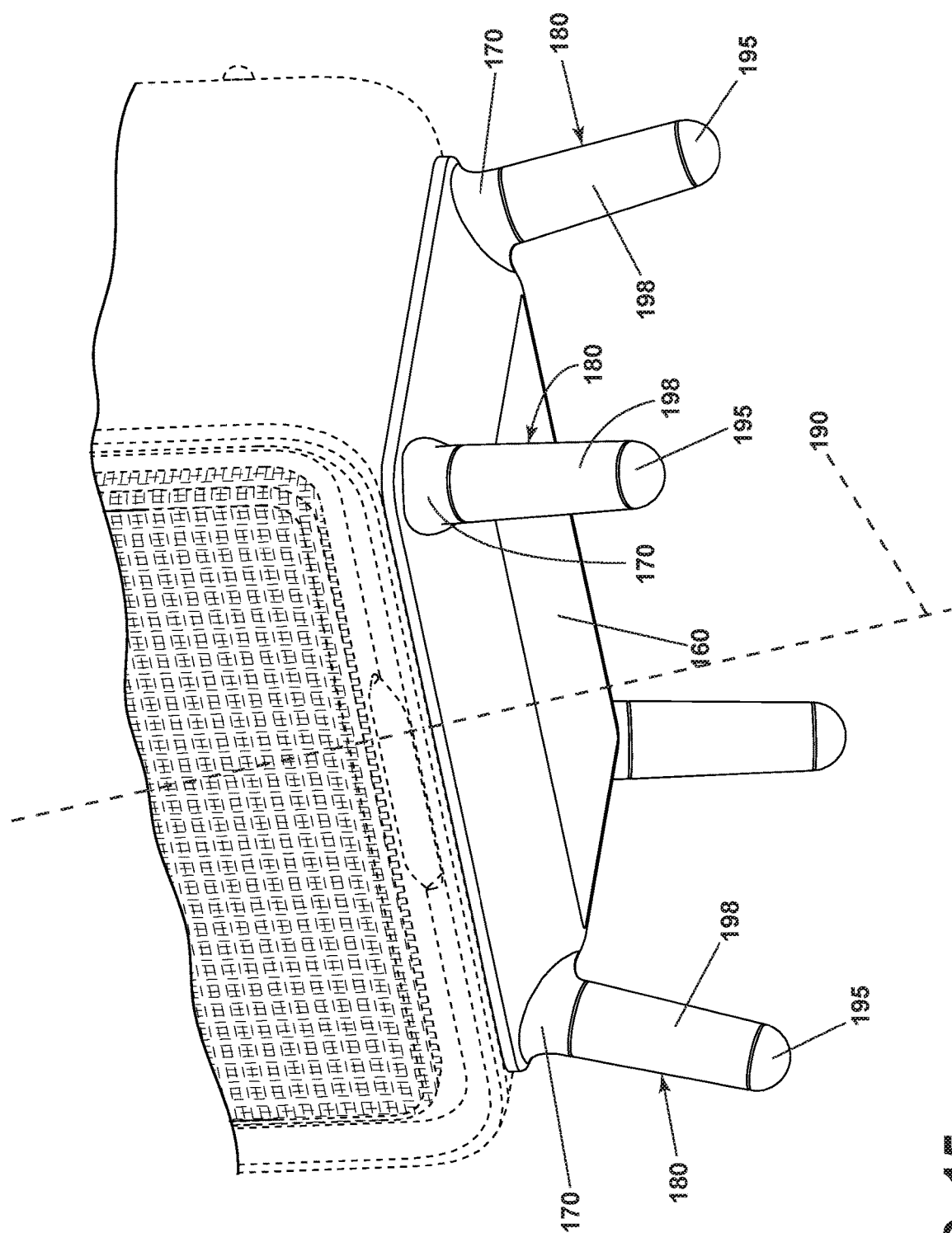
FIG. 15 is a closer view of the base of the embodiment of FIG. 12.

FIG. 15 shows more detail of the base 160 which is preferably formed of a polymer, either molded, injected, or assembled, though other materials such as wood or metal are within the scope of the invention. The base 160 comprises sockets 170 to receive the set of legs 180. Preferably, each socket will project at an angle generally outwardly away from a central axis 190. The number of sockets 170 will generally equal the number of legs 180 in the set. The base 160 is preferably adapted to be permanently affixed to the body 140 and to have a footprint that is no larger than that of the body 140. Alternatively, the set of legs 180 can directly attach to the base 160.

Each leg 180 is attached to the socket in any one of various well known ways, such as bolting, screwing, bayonet fixture, or snap or press fit. The legs 180 may be formed of wood, polymer, or composite materials, and will preferably have a tapered shape. Each leg 180 will have an elastomeric cap 195 at its terminal end to absorb vibrations and minimize noise from the air purifier 100. The legs 180 may also be covered by a hydrographic sleeve 198, with or without texture. The number of legs 180 will typically be four, though more or fewer are within the scope of the invention, so long as the number of legs is adequate to support the air purifier 100 on a surface.

FIGS. 16-32 illustrate the ornamental appearance of various embodiments of articles of furniture and air purifiers.

Figure 16:
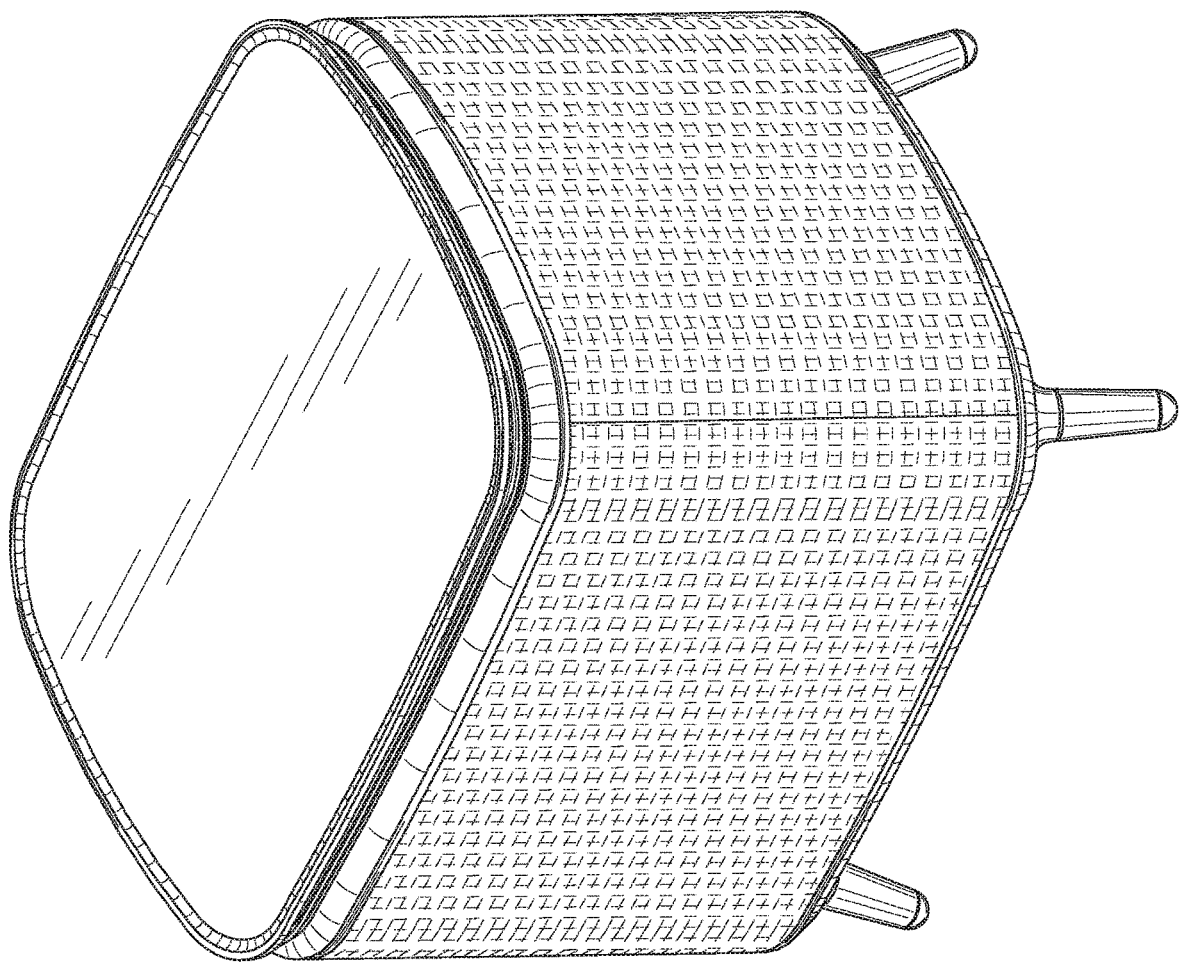
FIG. 16 is an isometric view of an embodiment of an article of furniture according to various aspects described herein.

FIG. 16 illustrates, in isometric view, the ornamental appearance of an embodiment of an article of furniture.

Figure 17:
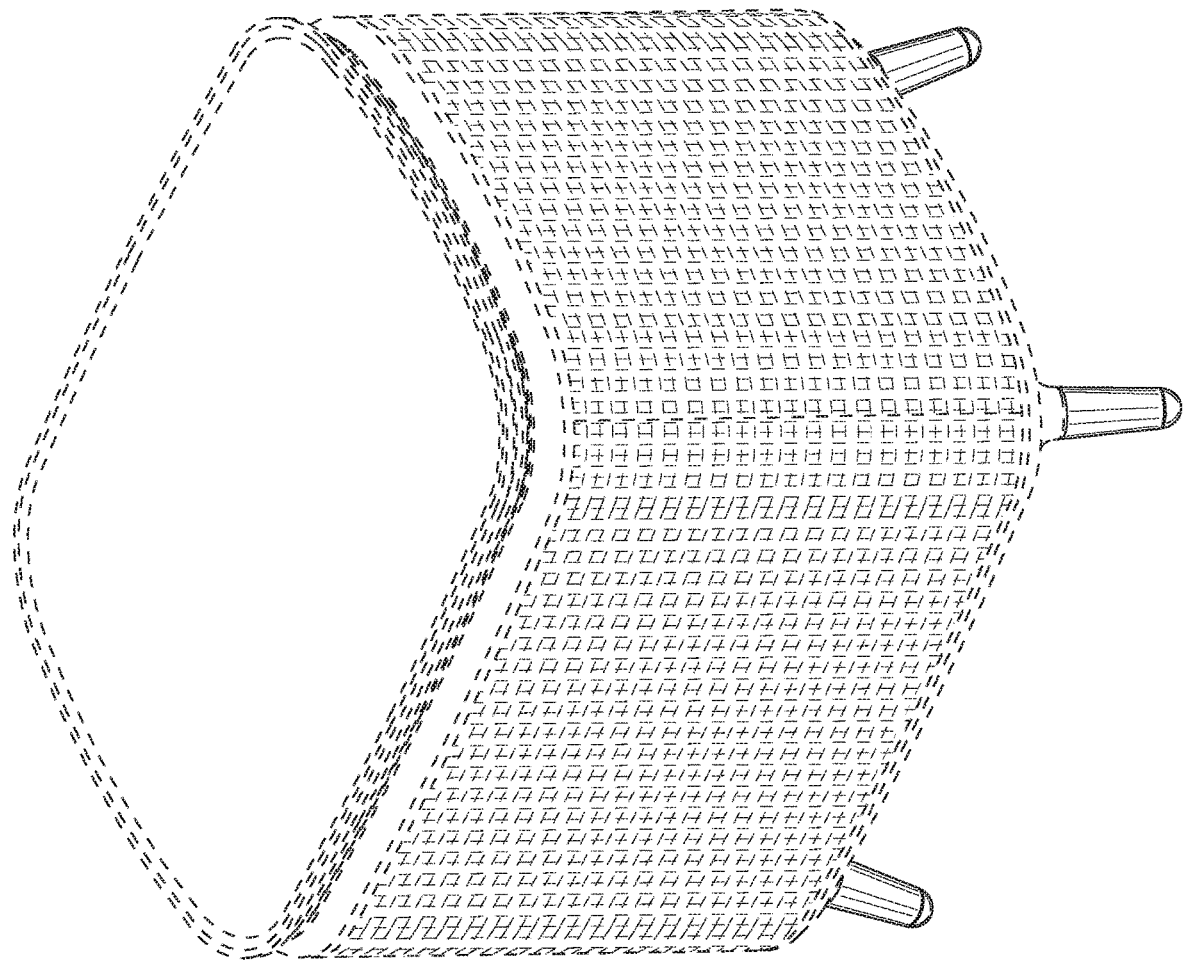
FIG. 17 is an isometric view of legs for the embodiment of FIG. 16.

FIG. 17 illustrates, in isometric view, the ornamental appearance of the legs of the embodiment of FIG. 16.

Figure 18:
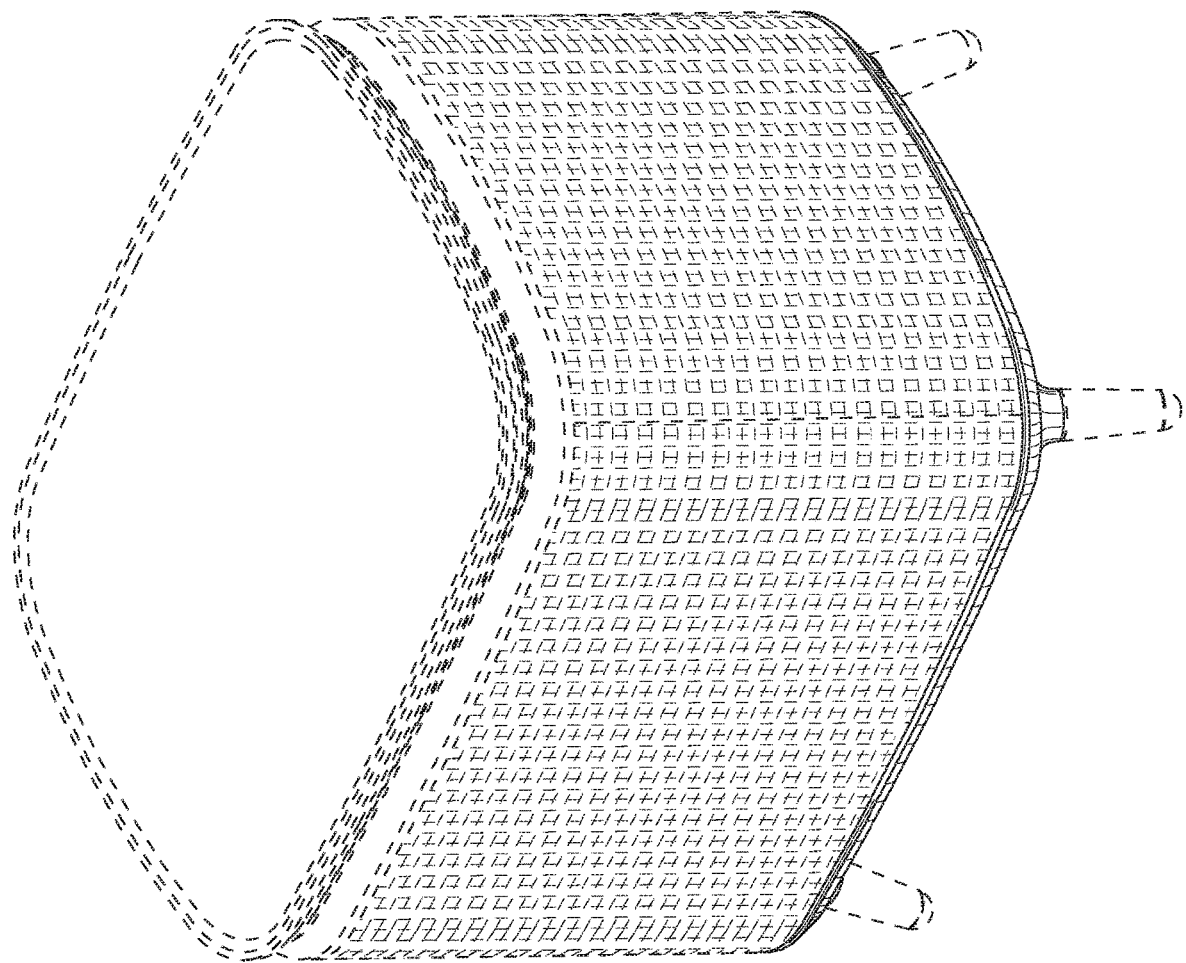
FIG. 18 is an isometric view of a base for the embodiment of FIG. 16.

FIG. 18 illustrates, in isometric view, the ornamental appearance of the base of the embodiment of FIG. 16.

Figure 19:
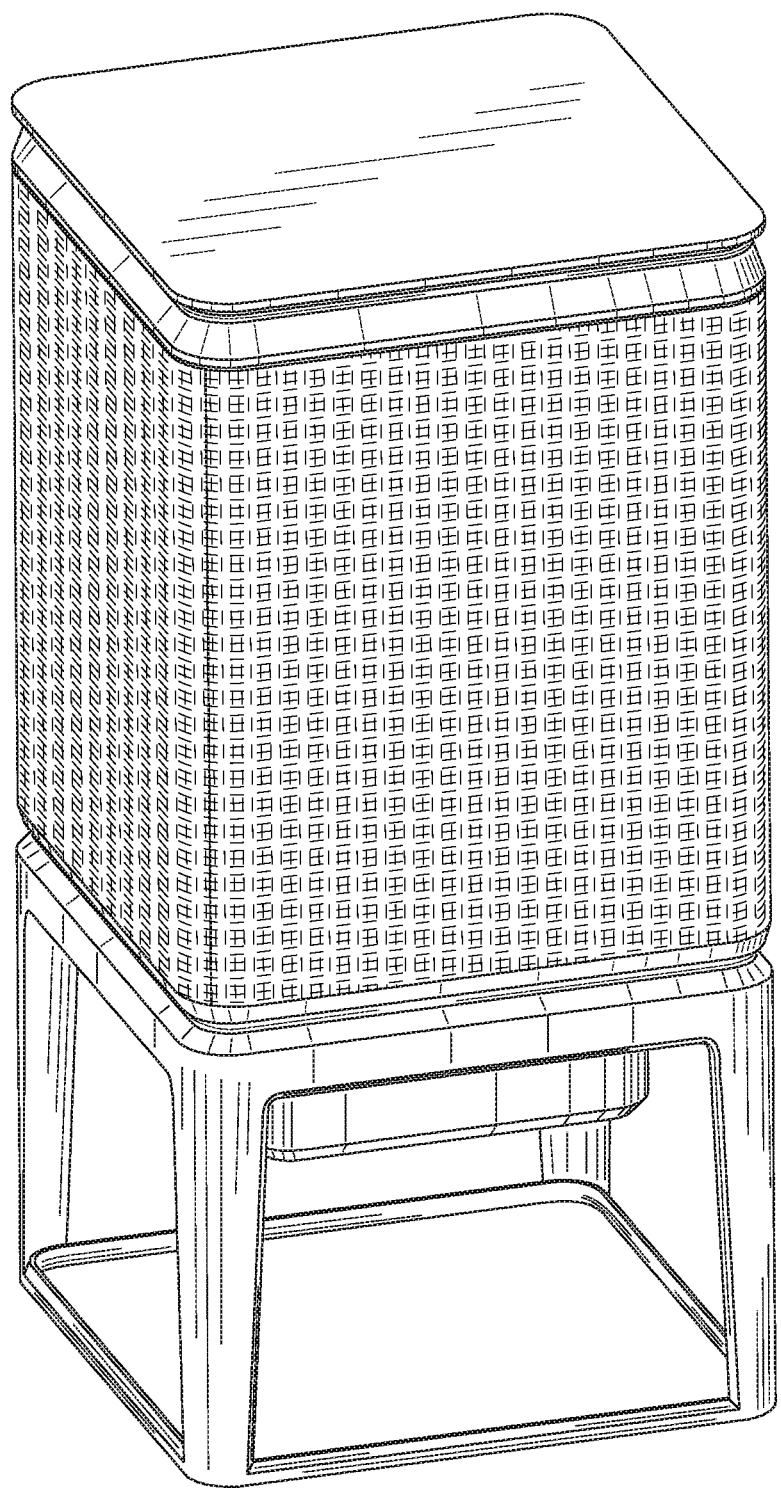
FIG. 19 is an isometric view of another embodiment of an article of furniture according to various aspects described herein.

FIG. 19 illustrates, in isometric view, the ornamental appearance of another embodiment of an article of furniture.

Figure 20:
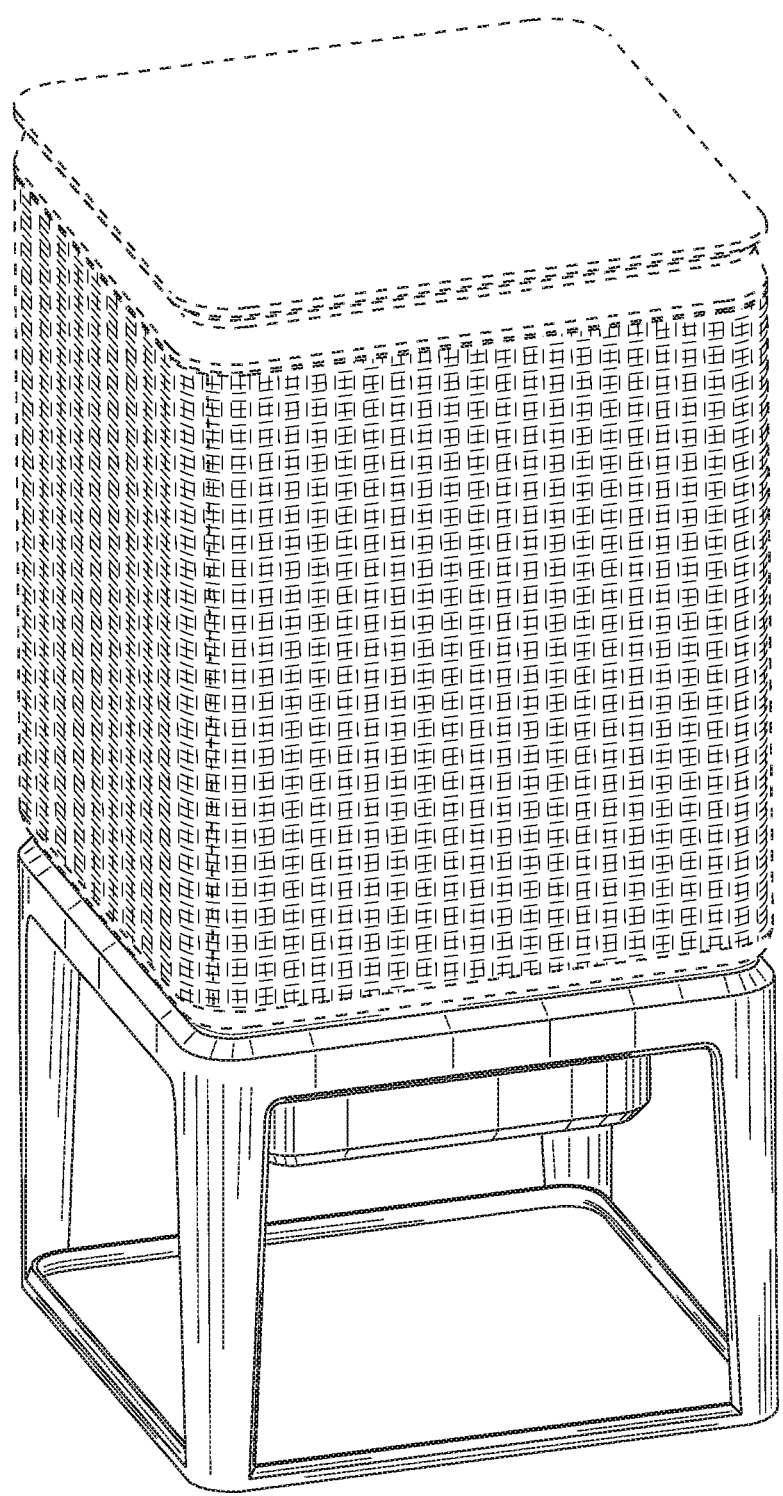
FIG. 20 is an isometric view of a base for the embodiment of FIG. 19.

FIG. 20 illustrates, in isometric view, the ornamental appearance of a base for the embodiment of FIG. 19.

Figure 21:
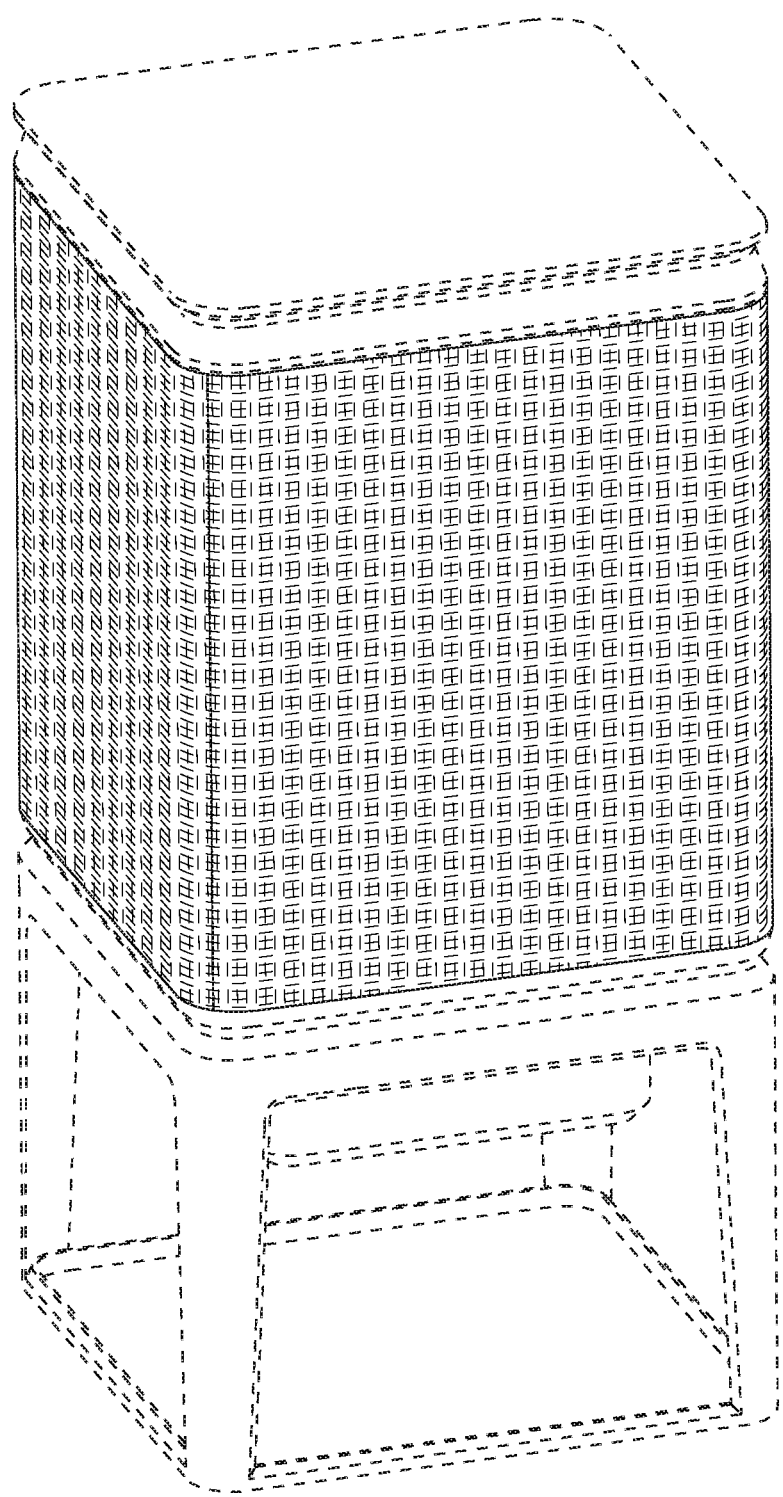
FIG. 21 is an isometric view of a body for the embodiment of FIG. 19.

FIG. 21 illustrates, in isometric view, the ornamental appearance of a body for the embodiment of FIG. 19.

Figure 22:
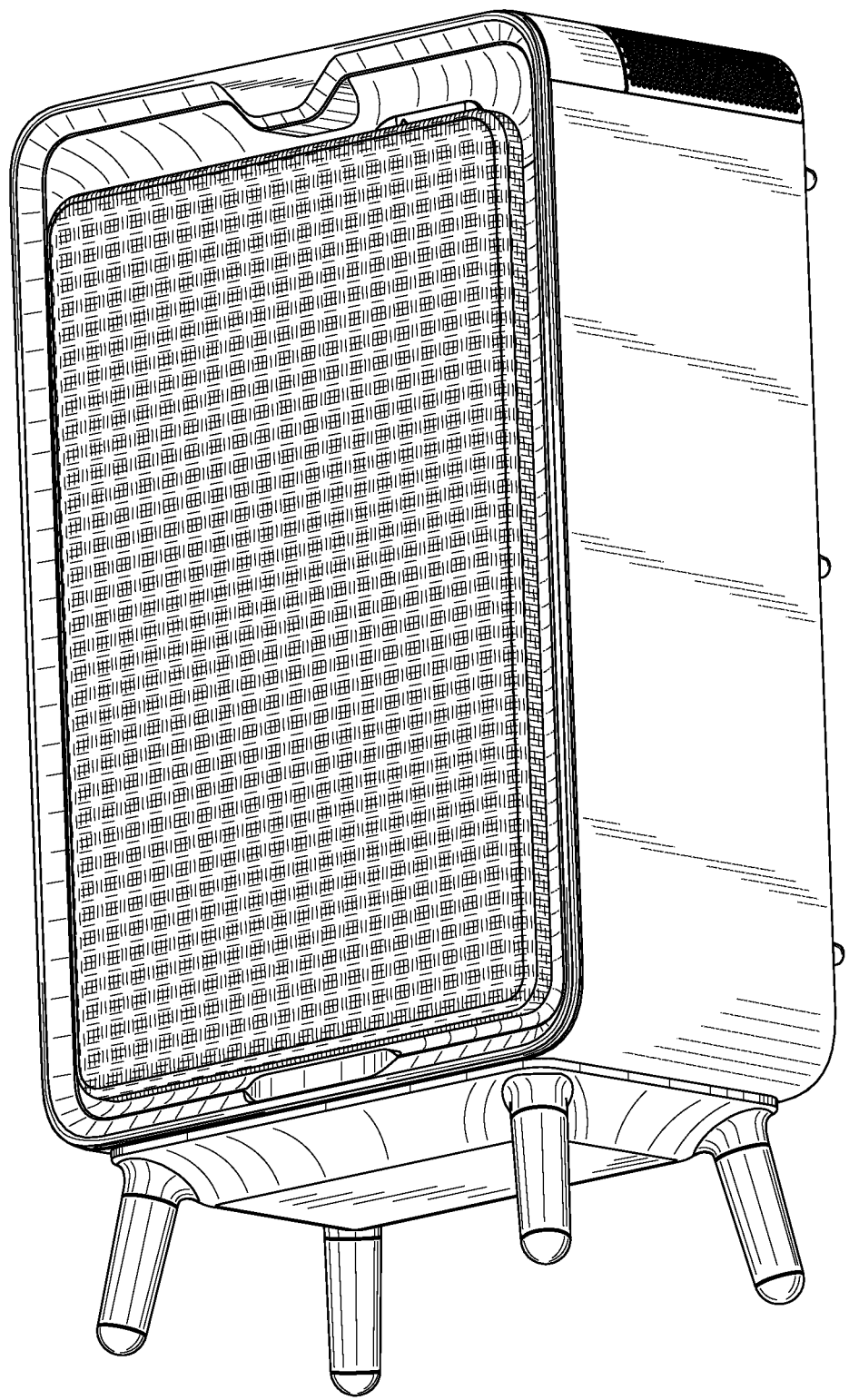
FIG. 22 is an isometric view of an embodiment of an air purifier according to various aspects described herein.

FIG. 22 illustrates, in isometric view, the ornamental appearance of an embodiment of an air purifier.

Figure 23:
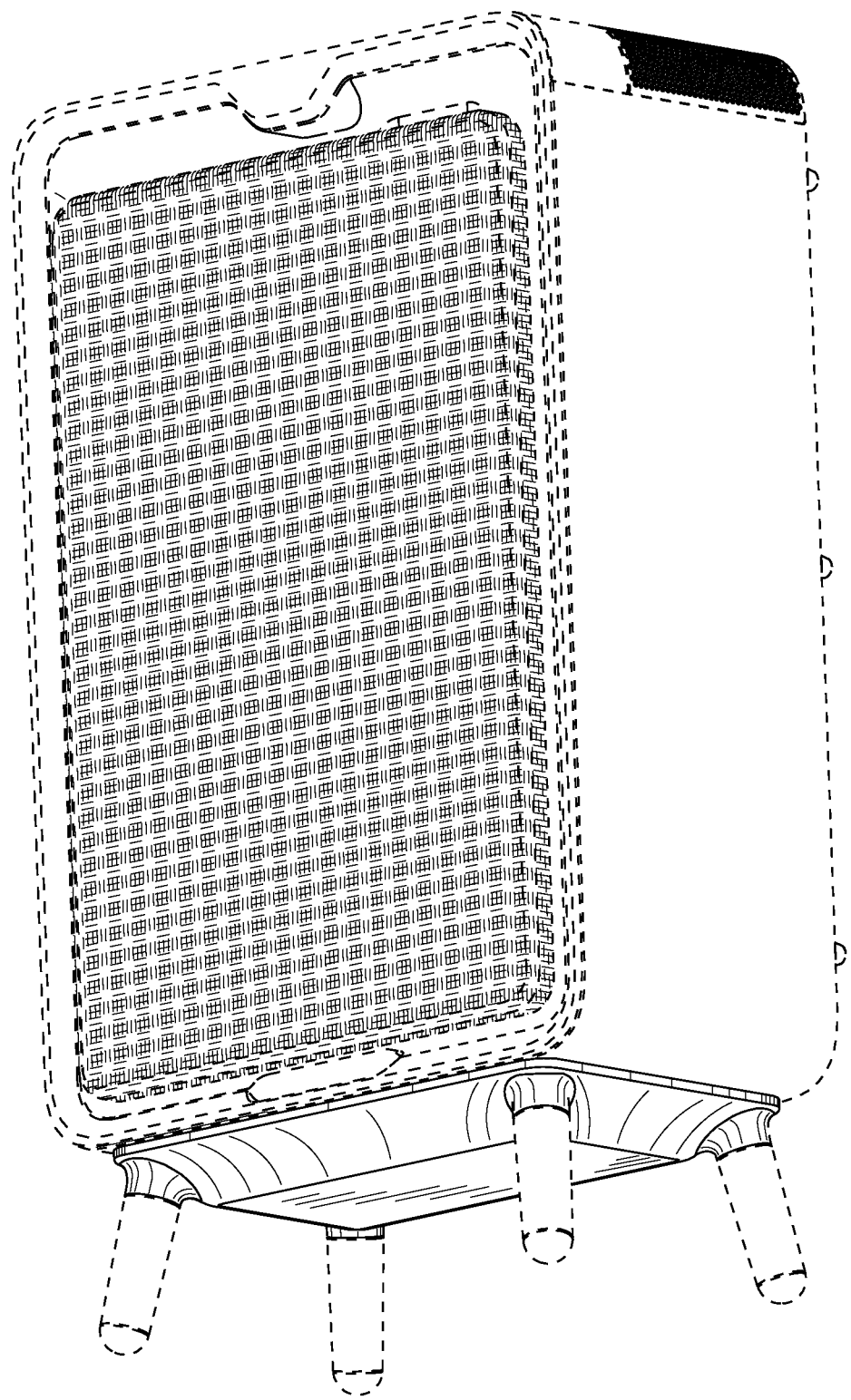
FIG. 23 an isometric view of a base for the embodiment of FIG. 22.

FIG. 23 illustrates, in isometric view, the ornamental appearance of a base of the embodiment of FIG. 22.

Figure 24:
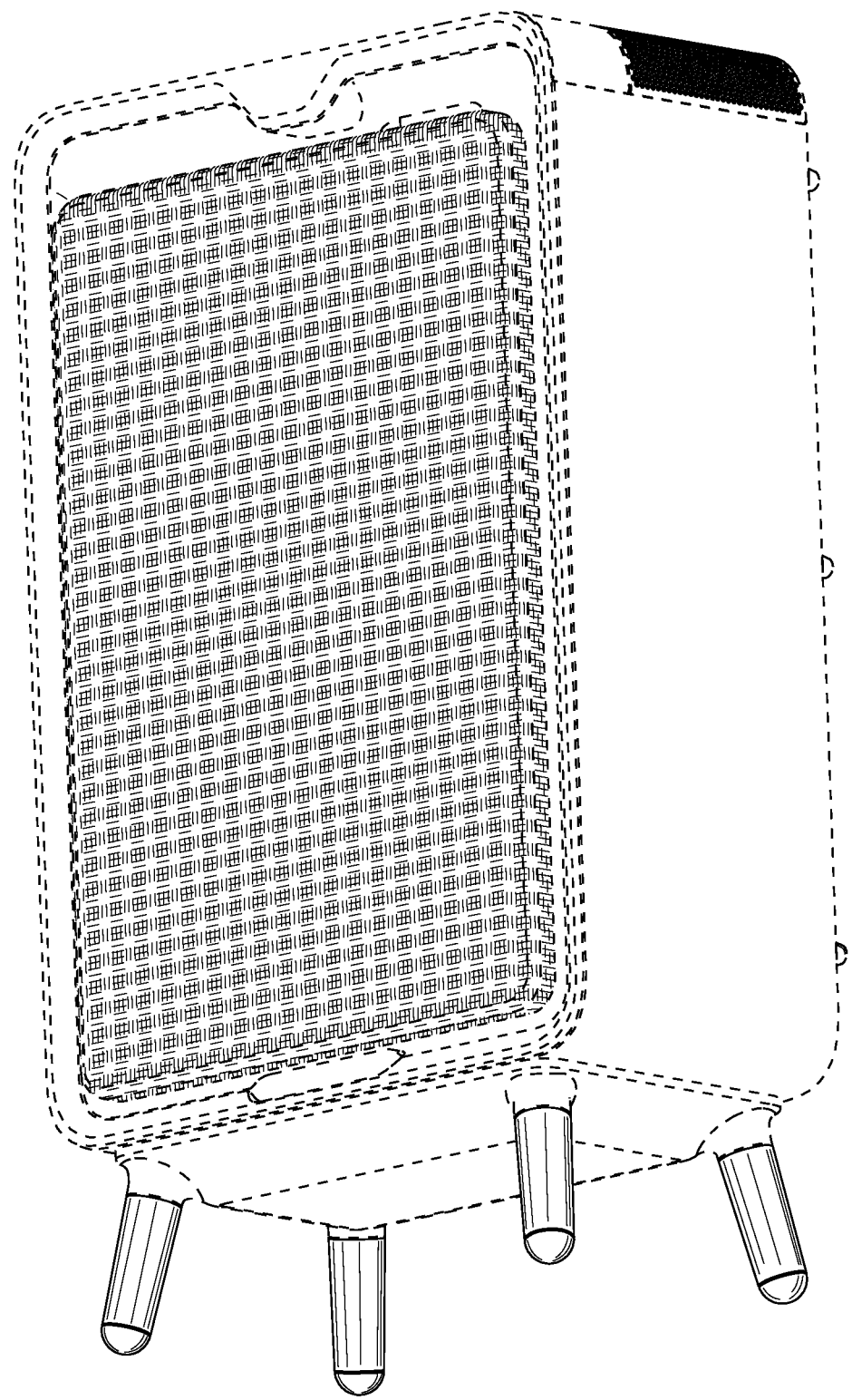
FIG. 24 is an isometric view of legs for the embodiment of FIG. 22.

FIG. 24 illustrates, in isometric view, the ornamental appearance of the legs of the embodiment of FIG. 22.

Figure 25:
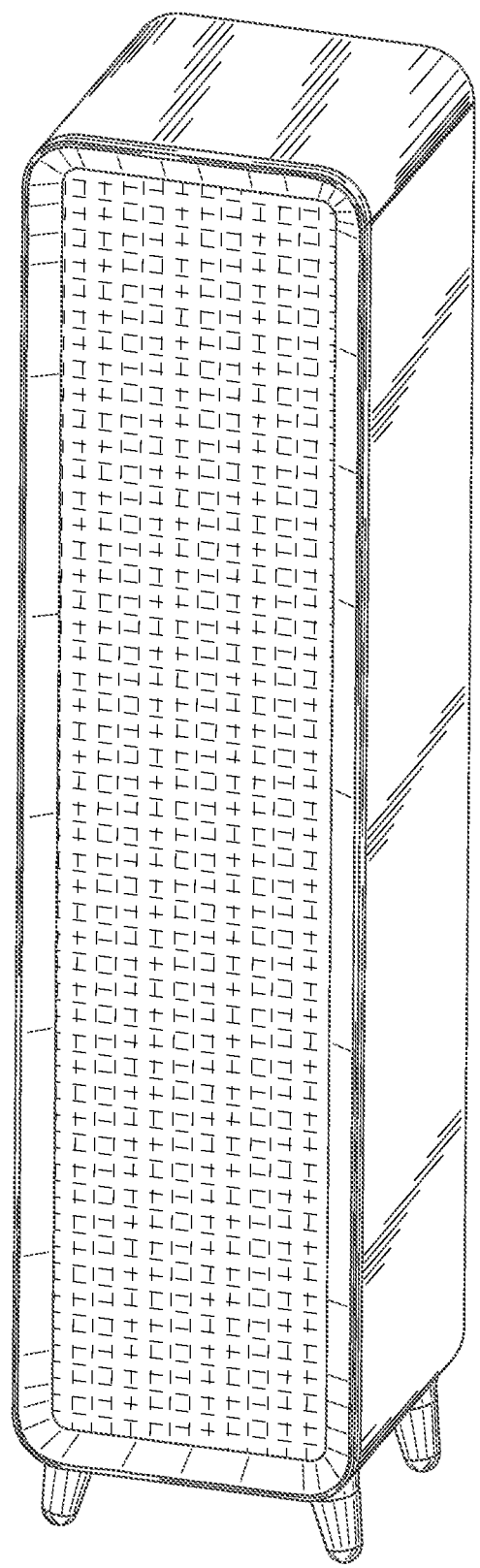
FIG. 25 is an isometric view of another embodiment of an air purifier according to various aspects described herein.

FIG. 25 illustrates, in isometric view, the ornamental appearance of another embodiment of an air purifier.

Figure 26:
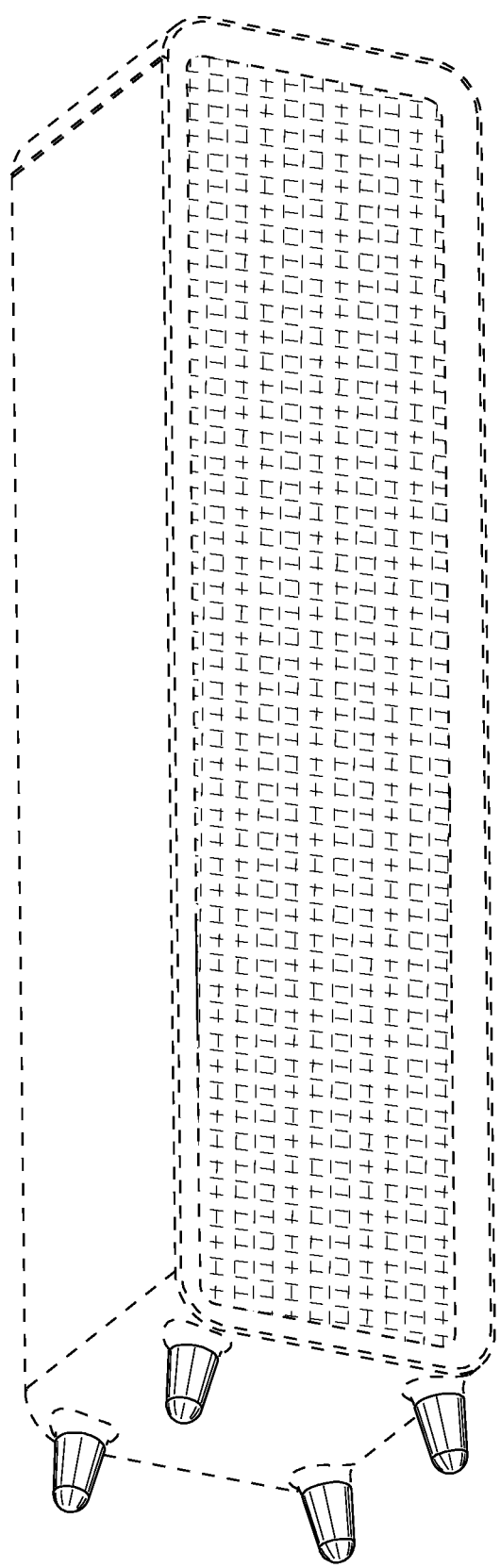
FIG. 26 is an isometric view of legs for the embodiment of FIG. 25.

FIG. 26 illustrates, in isometric view, the ornamental appearance of legs of the embodiment of FIG. 25.

Figure 27:
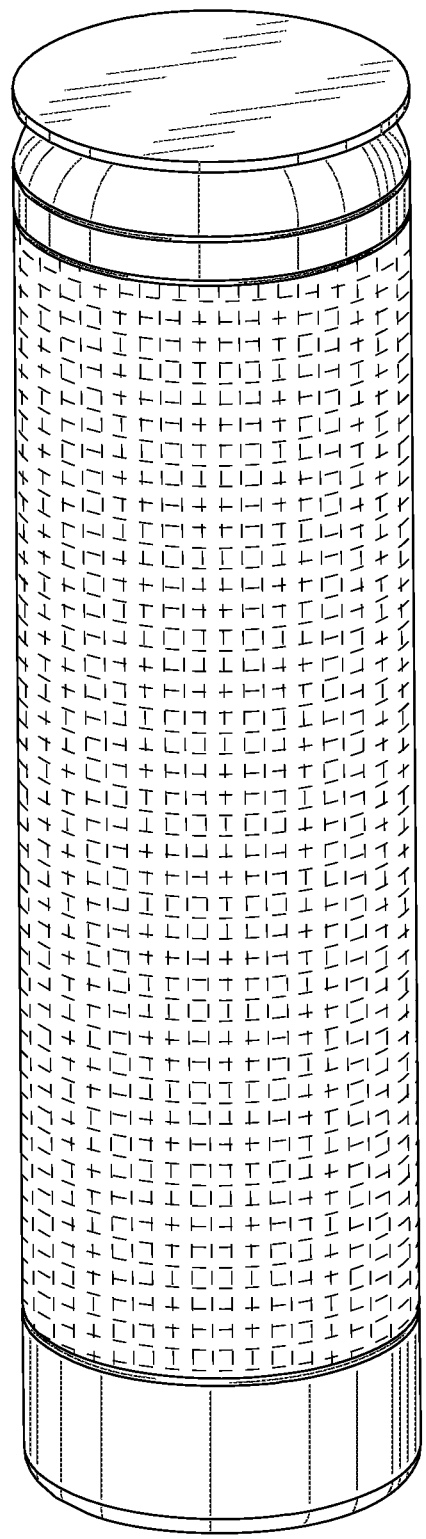
FIG. 27 is an isometric view of another embodiment of an air purifier according to various aspects described herein.

FIG. 27 illustrates, in isometric view, the ornamental appearance of another embodiment of an air purifier.

Figure 28:
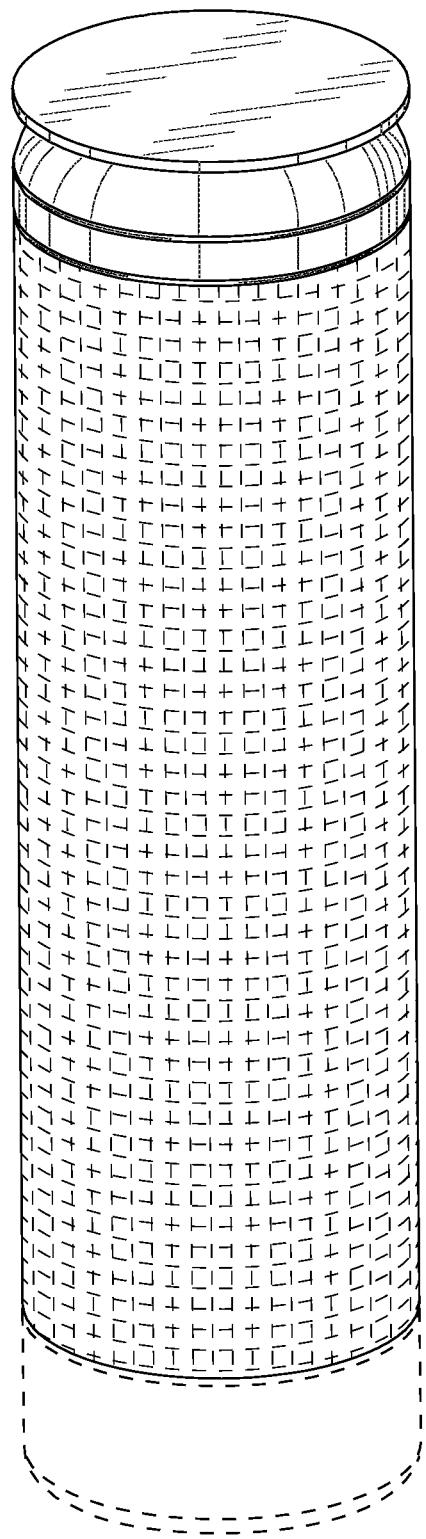
FIG. 28 is an isometric view of a top for the embodiment of FIG. 27.

FIG. 28 illustrates, in isometric view, the ornamental appearance of a top of the embodiment of FIG. 27.

Figure 29:
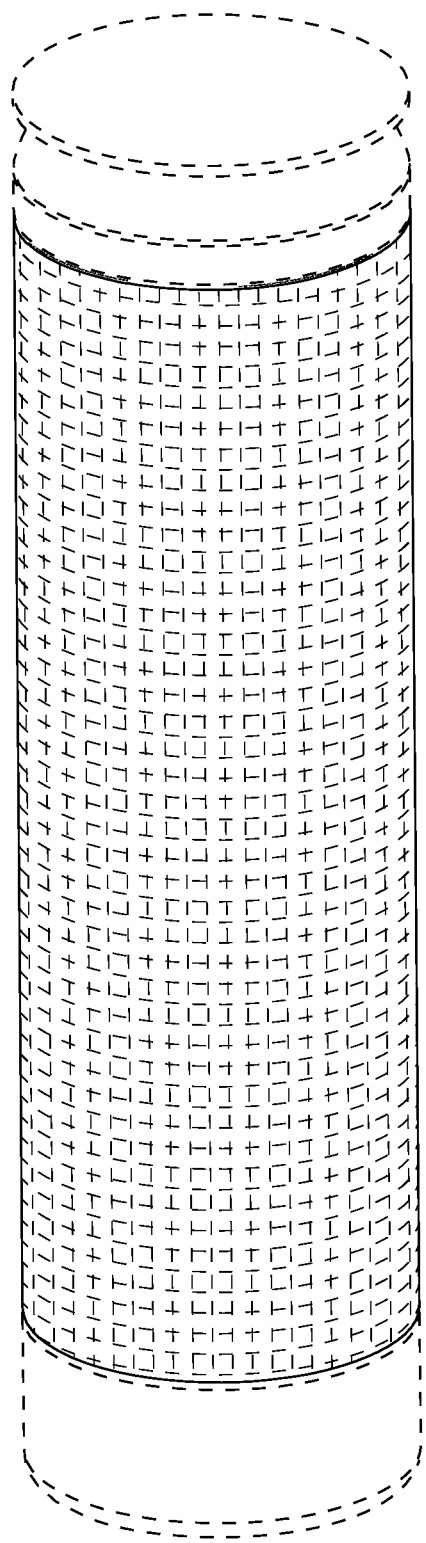
FIG. 29 is an isometric view of a body for the embodiment of FIG. 27.

FIG. 29 illustrates, in isometric view, the ornamental appearance of a body of the embodiment of FIG. 27.

Figure 30:
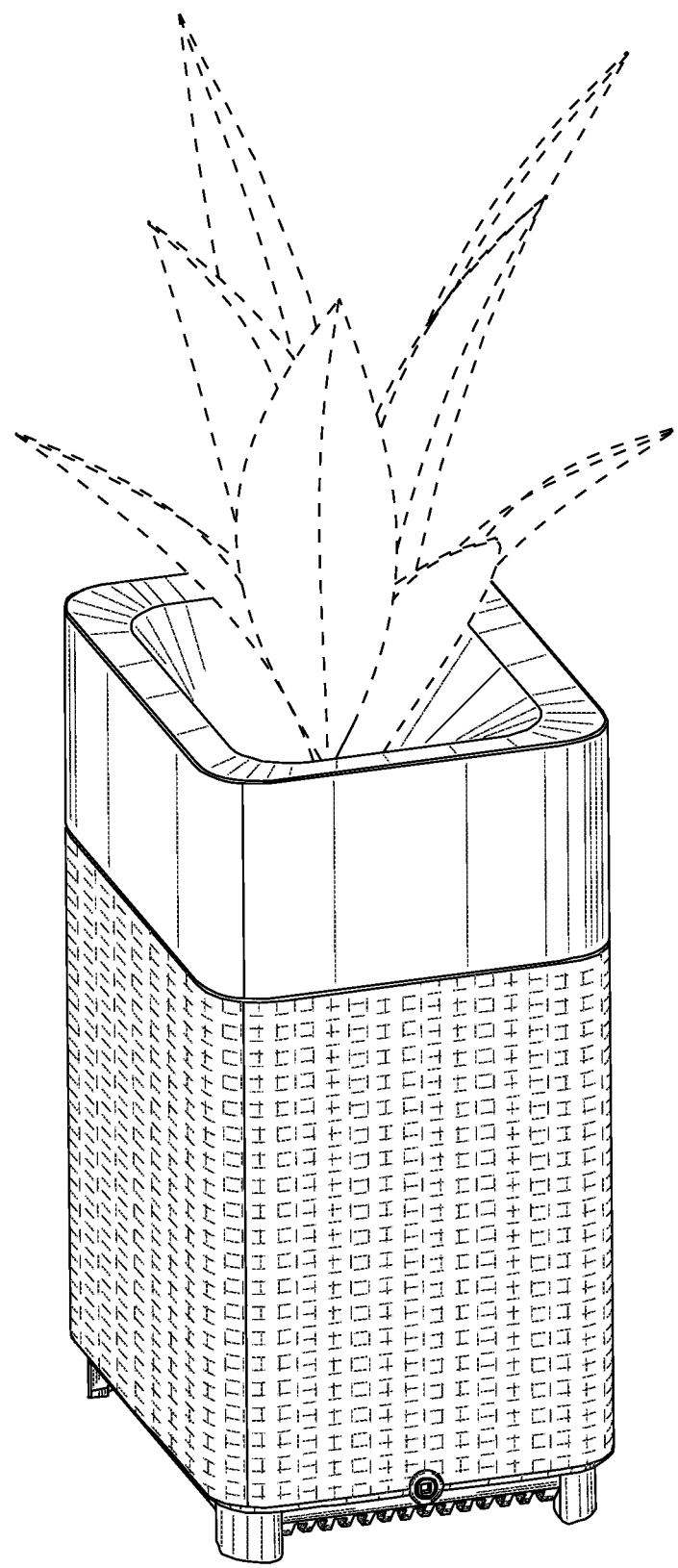
FIG. 30 is an isometric view of another embodiment of an air purifier according to various aspects described herein.

FIG. 30 illustrates, in isometric view, the ornamental appearance of another embodiment of an air purifier.

Figure 31:
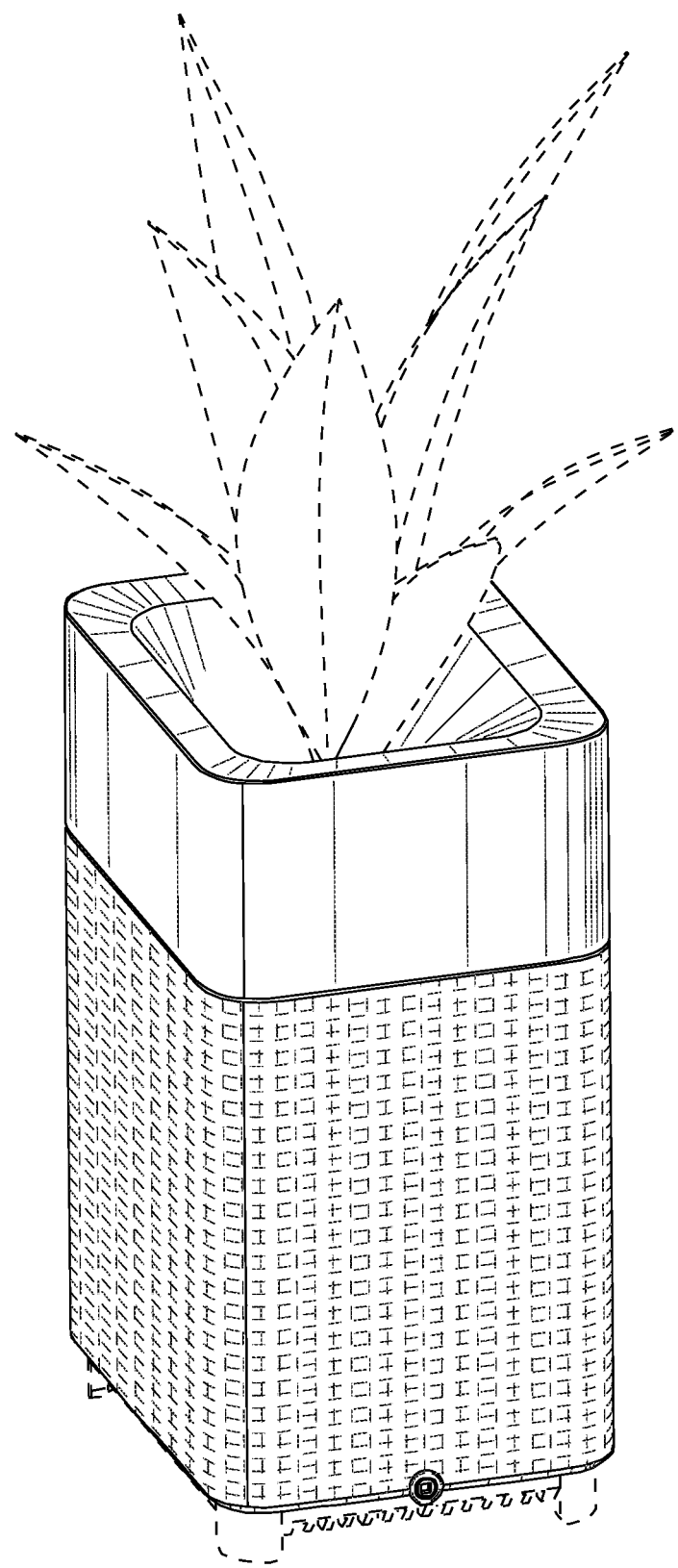
FIG. 31 is an isometric view of a top for the embodiment of FIG. 30.

FIG. 31 illustrates, in isometric view, the ornamental appearance of a top of the embodiment of FIG. 30.

Figure 32:
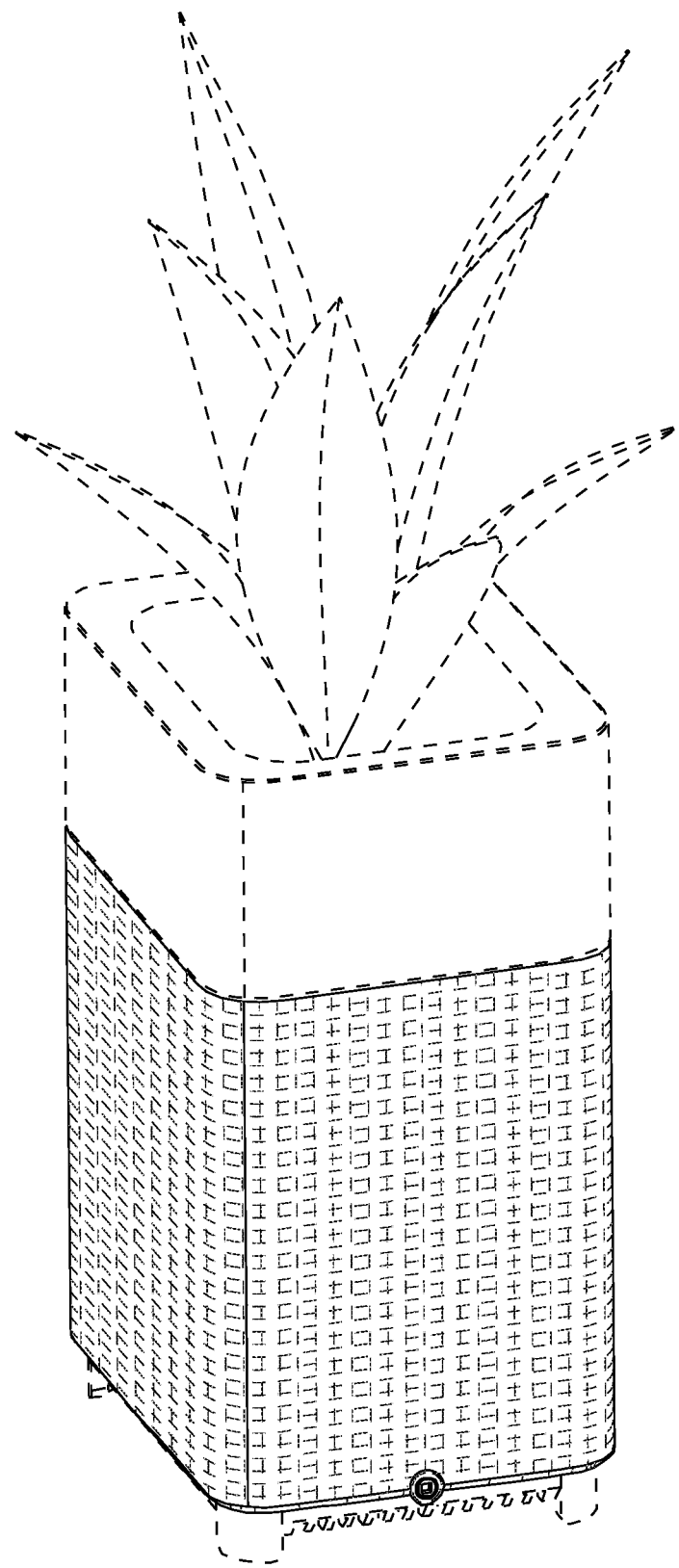
FIG. 32 is an isometric view of a base for the embodiment of FIG. 30.

FIG. 32 illustrates, in isometric view, the ornamental appearance of a base of the embodiment of FIG. 30.

To the extent not already described, the different features and structures of the various aspects of the present disclosure may be used in combination with each other as desired. Thus, the various features of the different aspects may be mixed and matched as desired to form new aspects, whether or not the new aspects are expressly described.

While aspects of the present disclosure have been specifically described in connection with certain specific aspects thereof, it is to be understood that this is by way of illustration and not of limitation. Reasonable variation and modification are possible within the scope of the forgoing disclosure and drawings without departing from the spirit of the present disclosure which is defined in the appended claims. Hence, specific dimensions and other physical characteristics relating to the aspects disclosed herein are not to be considered as limiting, unless the claims expressly state otherwise.

What is claimed is:

1. A room air purifier, comprising:
   a body at least partially defining an interior chamber and an opening to the interior chamber, the body having a top, a bottom, and a plurality of sides, wherein at least one of the plurality of sides includes the opening;
   a panel configured to removably mount to the at least one of the plurality of sides and cover the opening to the interior chamber;
   a purification mechanism in the interior chamber including at least one filter and at least one blower, wherein the purification mechanism is configured to generate an inflow through the panel and an outflow to an exterior of the body through at least a portion of the top of the body;
   a base mounted to the body;
   a set of legs coupled to the base; and
   a nonwoven fabric portion covering at least part of the body.

2. The room air purifier of claim 1, further comprising a user interface on the at least one of the plurality of sides.

3. The room air purifier of claim 1 wherein the at least one filter comprises a first filter configured to absorb particulates and a second filter configured to absorb gases.

4. The room air purifier of claim 3, further comprising a particulate matter sensor and a volatile organic compounds sensor.

5. The room air purifier of claim 1, further comprising a power panel on the body.

6. The room air purifier of claim 1, wherein each leg of the set of legs is mounted to a respective socket.

7. The room air purifier of claim 1 wherein each leg of the set of legs is covered by a hydrographic sleeve.

8. The room air purifier of claim 1, further comprising a user interface in the body over a recess.

9. The room air purifier of claim 6 wherein each leg of the set of legs has an elastomeric cap.

10. The room air purifier of claim 1, wherein the panel includes an open frame and a fabric cover mounted to the open frame.

11. The room air purifier of claim 10, wherein the opening includes a recess and wherein the opening is bound by a jamb located in the recess.

12. The room air purifier of claim 11, wherein the open frame includes a tab, wherein the tab enables the panel to be removed from and replaced on the jamb.

13. The room air purifier of claim 12, wherein the fabric cover extends over the recess to create the impression of an infinity background.

14. The room air purifier of claim 12, wherein a user interface is located at the tab or the recess.

15. The room air purifier of claim 10, wherein the at least one filter is mounted to the open frame.

16. The room air purifier of claim 15, wherein the at least one filter is configured to filter particulate matter or volatile organic compounds.

17. The room air purifier of claim 10, wherein the open frame includes hooks or latches to selectively mount the open frame to the at least one of the plurality of sides of the room air purifier.

18. The room air purifier of claim 1, wherein the at least a portion of the top of the body includes a plurality of openings, fluidly coupling the interior chamber to the exterior of the body of the room air purifier.

* * * * *